United States Patent
Pasam et al.

(10) Patent No.: US 10,425,506 B2
(45) Date of Patent: Sep. 24, 2019

(54) TRANSFORMING MACHINE DATA IN A COMMUNICATION SYSTEM

(71) Applicant: Xaptum, Inc., Chicago, IL (US)

(72) Inventors: Rohit Pasam, Chicago, IL (US); Venkatakumar Srinivasan, Chicago, IL (US); Pradeep Srinivas Barthur, White Plains, NY (US)

(73) Assignee: Xaptum, Inc., Chicago, IL (US)

( * ) Notice: Subject to any disclaimer, the term of this patent is extended or adjusted under 35 U.S.C. 154(b) by 0 days.

(21) Appl. No.: 15/812,775

(22) Filed: Nov. 14, 2017

(65) Prior Publication Data

US 2018/0139309 A1    May 17, 2018

Related U.S. Application Data

(60) Provisional application No. 62/422,469, filed on Nov. 15, 2016.

(51) Int. Cl.

| | |
|---|---|
| *H04L 29/08* | (2006.01) |
| *H04L 29/06* | (2006.01) |
| *H04W 4/38* | (2018.01) |
| *H04W 4/70* | (2018.01) |
| *H04W 84/18* | (2009.01) |
| *H04L 9/08* | (2006.01) |

(Continued)

(52) U.S. Cl.
CPC .......... *H04L 69/08* (2013.01); *H04L 67/1097* (2013.01); *H04L 67/2819* (2013.01); *H04L 67/2823* (2013.01); *H04W 4/38* (2018.02); *H04W 4/70* (2018.02); *H04L 9/0819* (2013.01); *H04L 67/12* (2013.01); *H04L 69/18* (2013.01); *H04W 4/50* (2018.02); *H04W 12/06* (2013.01); *H04W 84/18* (2013.01)

(58) Field of Classification Search
CPC ..... H04L 67/10; H04L 67/1097; H04L 41/12; H04L 67/02; H04L 41/5096; H04L 67/125
See application file for complete search history.

(56) References Cited

U.S. PATENT DOCUMENTS

| | | | |
|---|---|---|---|
| 2013/0111217 A1* | 5/2013 | Kopasz ............... | G06F 21/6245 713/189 |
| 2013/0211555 A1* | 8/2013 | Lawson ............. | G05B 19/4185 700/28 |

(Continued)

*Primary Examiner* — Sai Aung
(74) *Attorney, Agent, or Firm* — Garlick & Markison; Gary W. Grube

(57) ABSTRACT

A method for processing machine data within a communication system that includes a computing unit receiving a network data message from a wireless access node of the communication system and determining whether the network data message includes machine data. When the network data message includes the machine data, the method further includes the computing unit identifying a wireless data device associated with the network data message to produce a wireless data device identifier, identifying one or more cloud services to produce one or more cloud service identifiers, and for each cloud service, processing the machine data to produce a transformed data message, where the transformed data message is in accordance with a data protocol associated with the cloud service, and facilitating transmission of the transformed data message to the cloud service.

16 Claims, 12 Drawing Sheets

(51) Int. Cl.
    *H04W 12/06*        (2009.01)
    *H04W 4/50*         (2018.01)

(56) References Cited

U.S. PATENT DOCUMENTS

| | | | |
|---|---|---|---|
| 2015/0156266 A1* | 6/2015 | Gupta | H04W 4/70 |
| | | | 709/224 |
| 2017/0026469 A1* | 1/2017 | Usgaonkar | H04L 67/1097 |
| 2018/0026873 A1* | 1/2018 | Cheng | H04L 45/22 |
| | | | 709/239 |

* cited by examiner

TRANSFORMING MACHINE DATA IN A COMMUNICATION SYSTEM

CROSS REFERENCE TO RELATED PATENTS

The present U.S. Utility Patent Application claims priority pursuant to 35 U.S.C. § 119(e) to U.S. Provisional Application No. 62/422,469, entitled "SYSTEMS, METHODS AND DEVICES FOR EDGE ROUTING AND SYNCHRONIZATION IN A DATA COMMUNICATION NETWORK," filed Nov. 15, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computing devices to communicate text files, voice files, multimedia files, and even live data streaming is well known. Most computing devices utilize the Internet protocol (IP) to communicate via the Internet. The Internet protocol is well known to be the primary network communications protocol utilized on the Internet, where IP provides a network layer protocol in accordance with one or more industry standards such as transmission control protocol (TCP), user datagram protocol (UDP), and stream control transmission protocol (SCTP). It is also well-known for computing devices to utilize a transport protocol on top of the network layer protocol to transport data between computing devices, where the transport protocol is in accordance with one or more industry standard session protocols such as hypertext transfer protocol (HTTP) and Message queue telemetry transport (MQTT). In particular, it is known that MQTT may be used as a messaging protocol on top of TCP where network bandwidth is limited.

The Internet of things (IoT) is known to include an interworking of smart devices (e.g., computers, sensors, actuators) that enables the smart devices to collect and exchange machine data across existing network infrastructure to further integrate physical world entities of the smart devices into computer systems to provide benefit (e.g., lower costs, more efficiency, more accuracy, etc.). IoT example smart devices include smart thermostats networked with heating and air-conditioning systems, refrigerators that sense content and automatically order replacement food items, lighting systems that detect actual need and adjust lighting levels to reduce costs, and home environmental monitors that monitor and report flooding, smoke, and fire. Internet of things systems may include tens, hundreds, and even thousands of smart devices within a common physical area. Communication of information from thousands of co-located smart devices is known to be challenging from an organization perspective and physical communication perspective.

Such Internet of things smart devices are known to communicate smaller amounts of data as compared to general computing devices communicating the text files, audio files, multimedia files, and live data streaming. It is also known that many Internet industry standards were not optimal for utilization by IoT devices. As such, further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. It is also known that there are at least tens of variants of CoAP which provides flexibility but with added complexity (e.g., simultaneously supporting multiple software protocol agents on a single IoT smart device) and a potential for incompatibility of devices when they are unequipped to communicate in a common variant of the standard.

Computing devices (e.g., including IoT smart devices) are generally required to understand every protocol and data format from the various devices connected to the same network. Existing solutions require: (1) multiple protocol software agents on the computing device; (2) computing device-specific protocol software agents on the computing device; and/or (3) a universal translation software agent on the computing device that converts data from any protocol to a specific protocol and data format. It is also known that modifying installed base computing devices to include such multiple protocol software agents can require significant time, effort, resources, and diligence. In some cases, the complexity increases even further when computing devices are required to communicate with multiple other computing devices simultaneously on the network, where each of the other computing devices utilizes a different data protocol.

BRIEF DESCRIPTION OF THE SEVERAL VIEWS OF THE DRAWING(S)

Figure 6A:
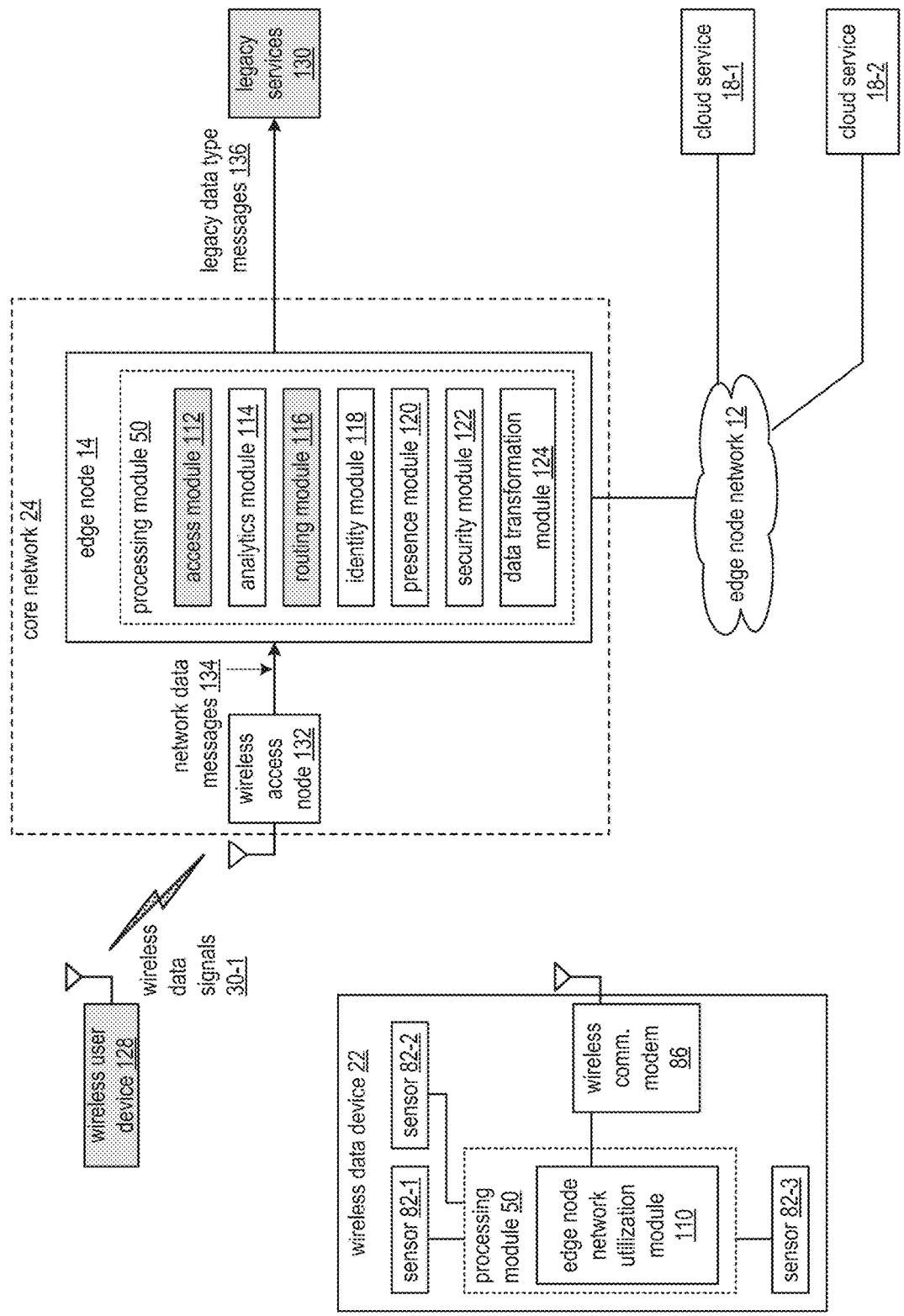
Figure 6B:
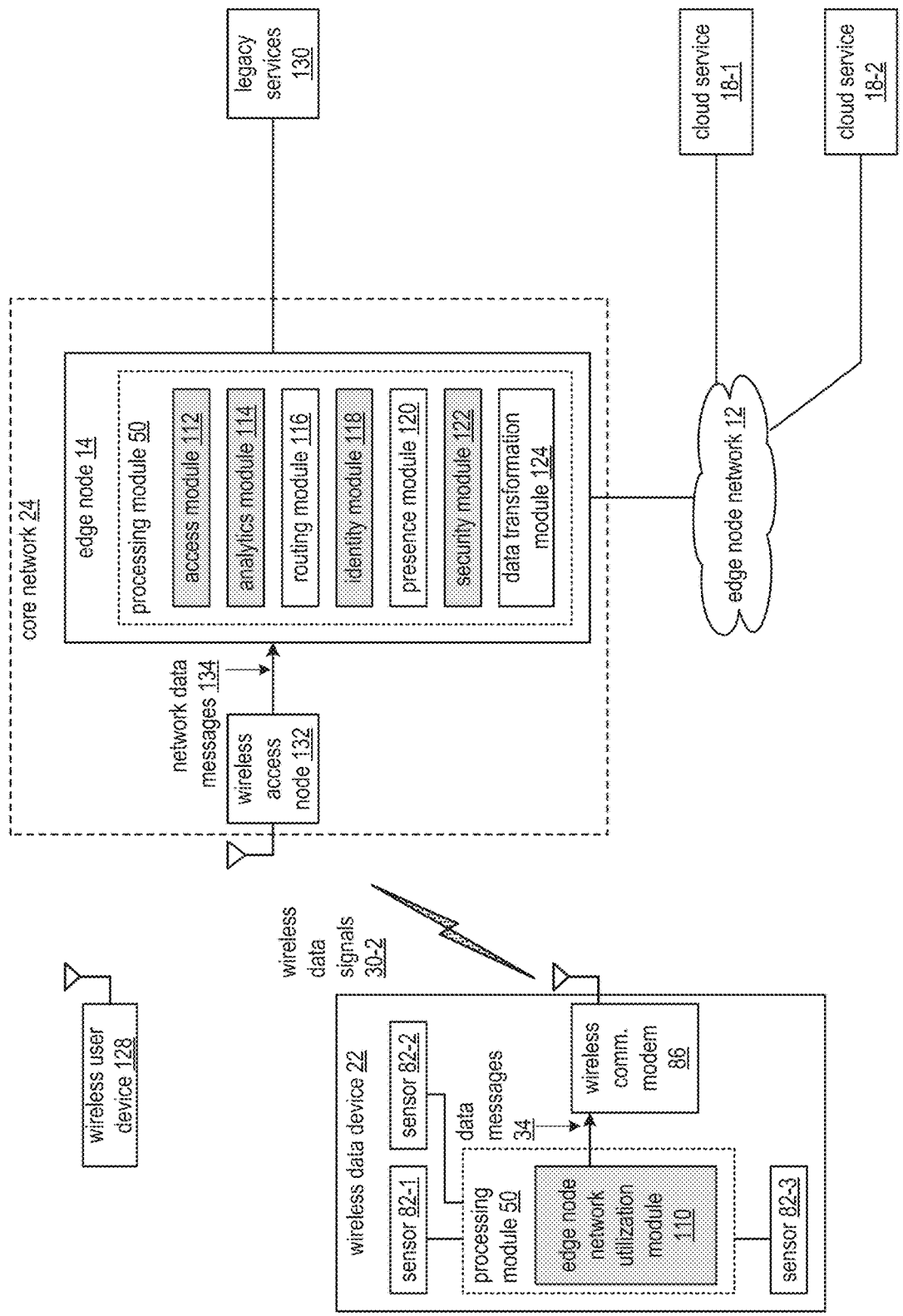
Figure 6C:
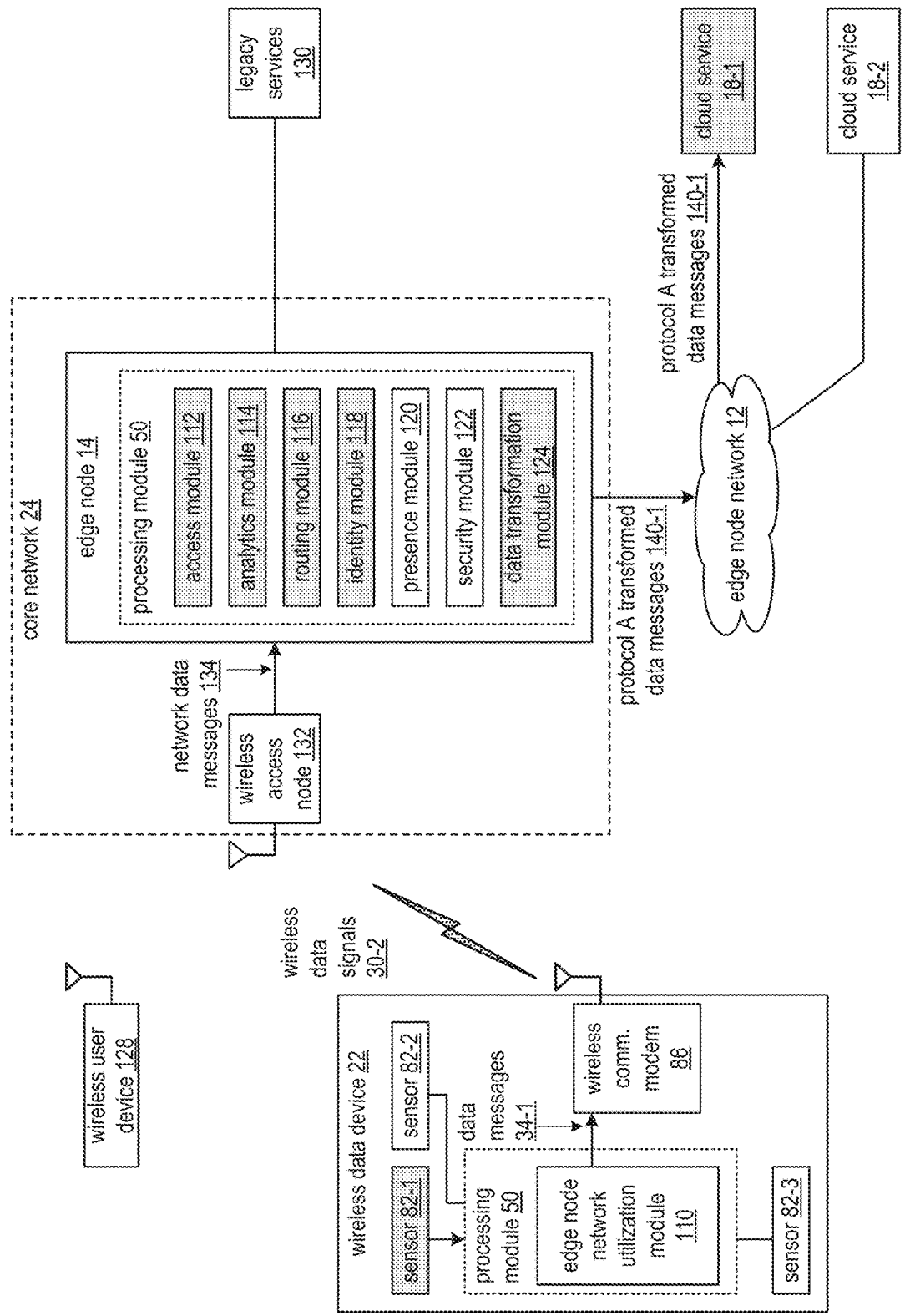
Figure 6D:
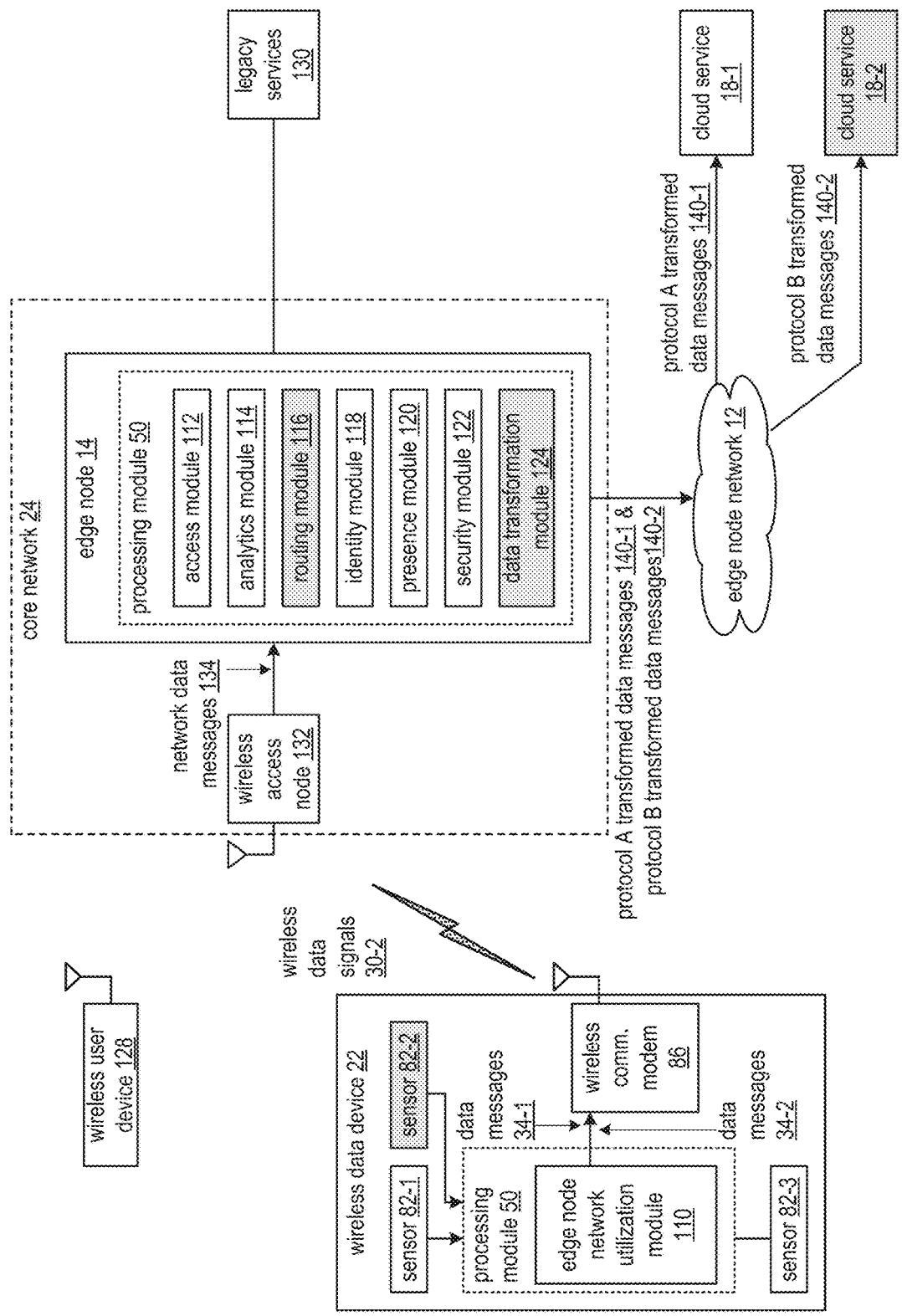
Figure 6E:
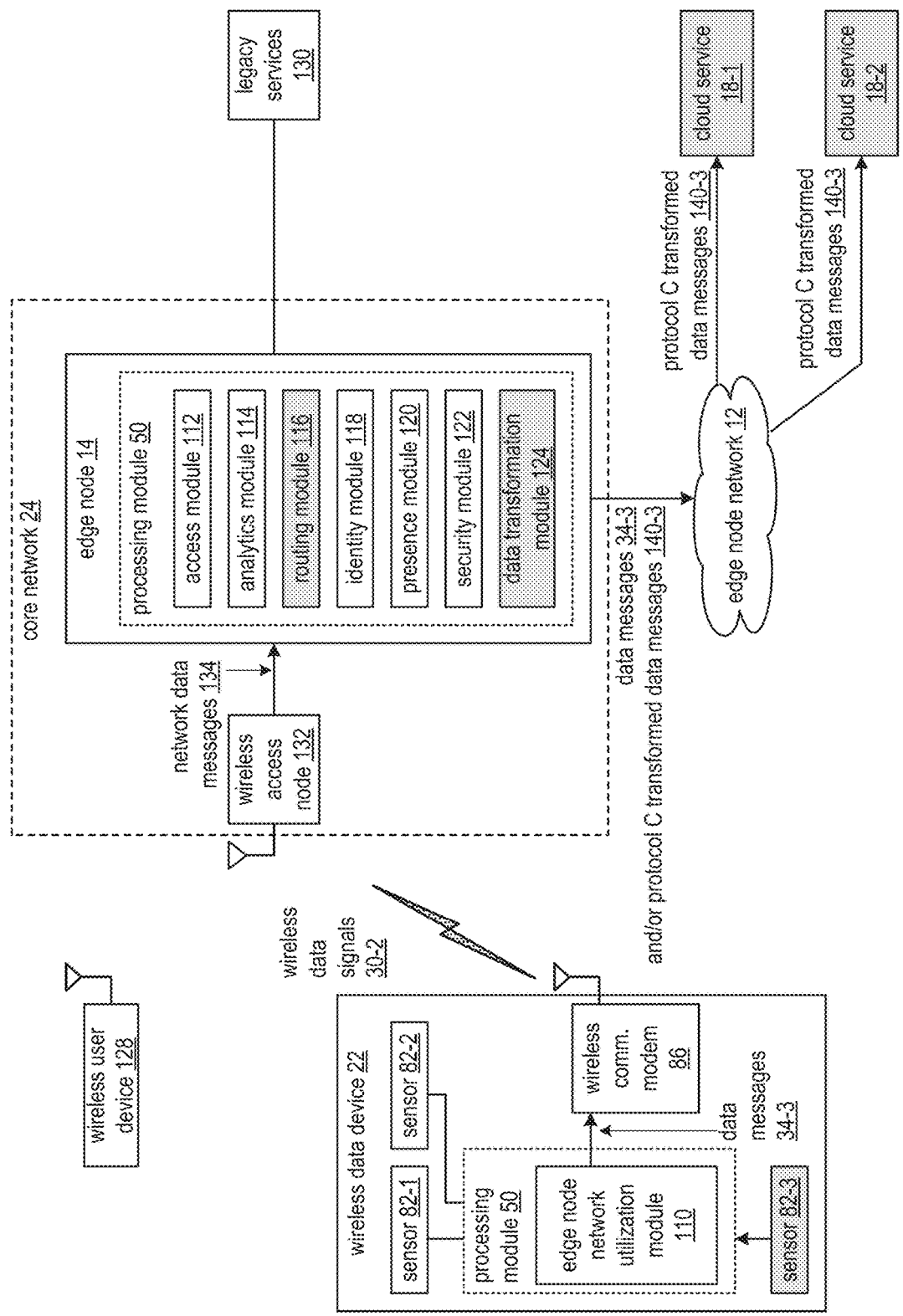
Figure 6F:
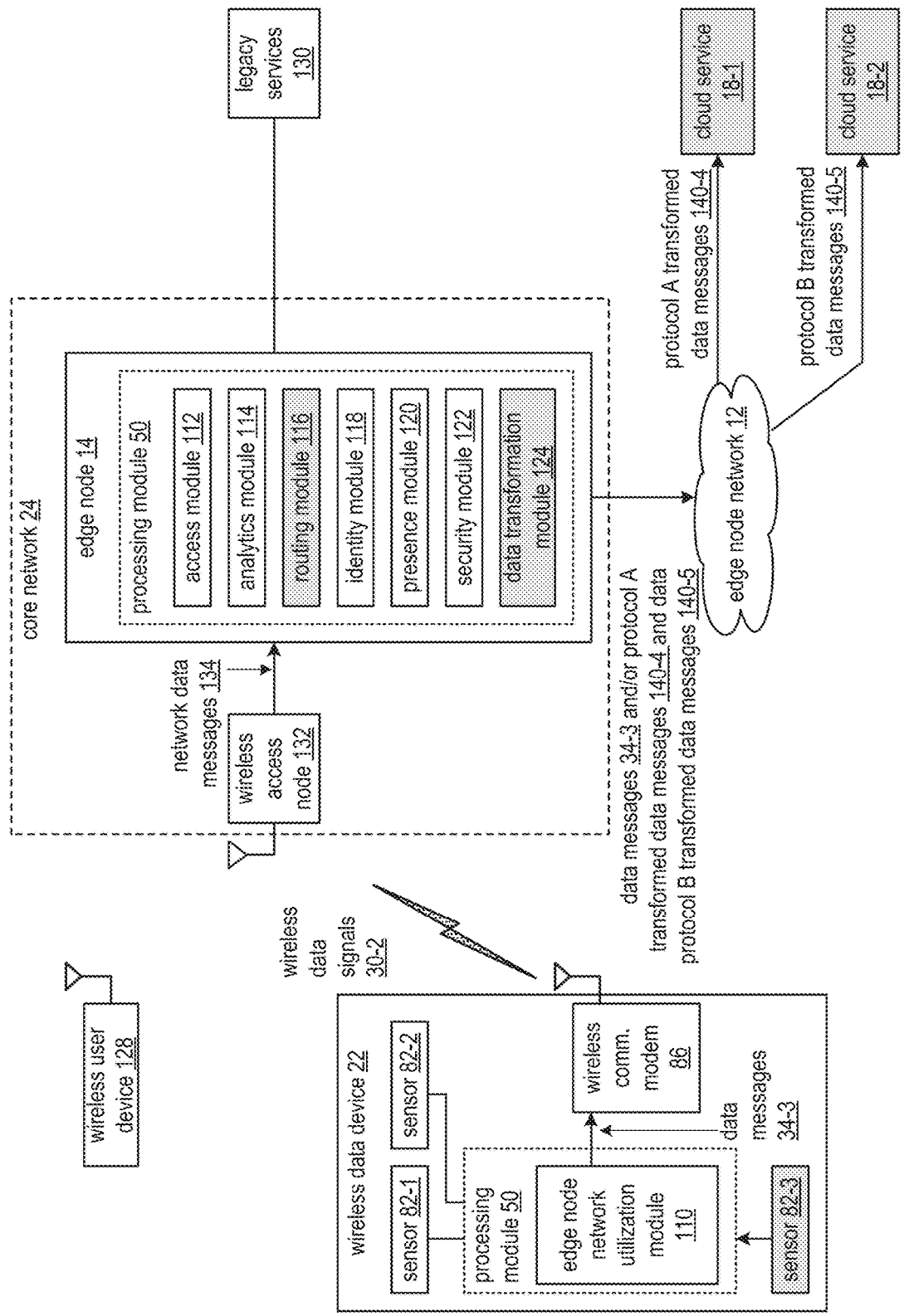
Figure 6G:
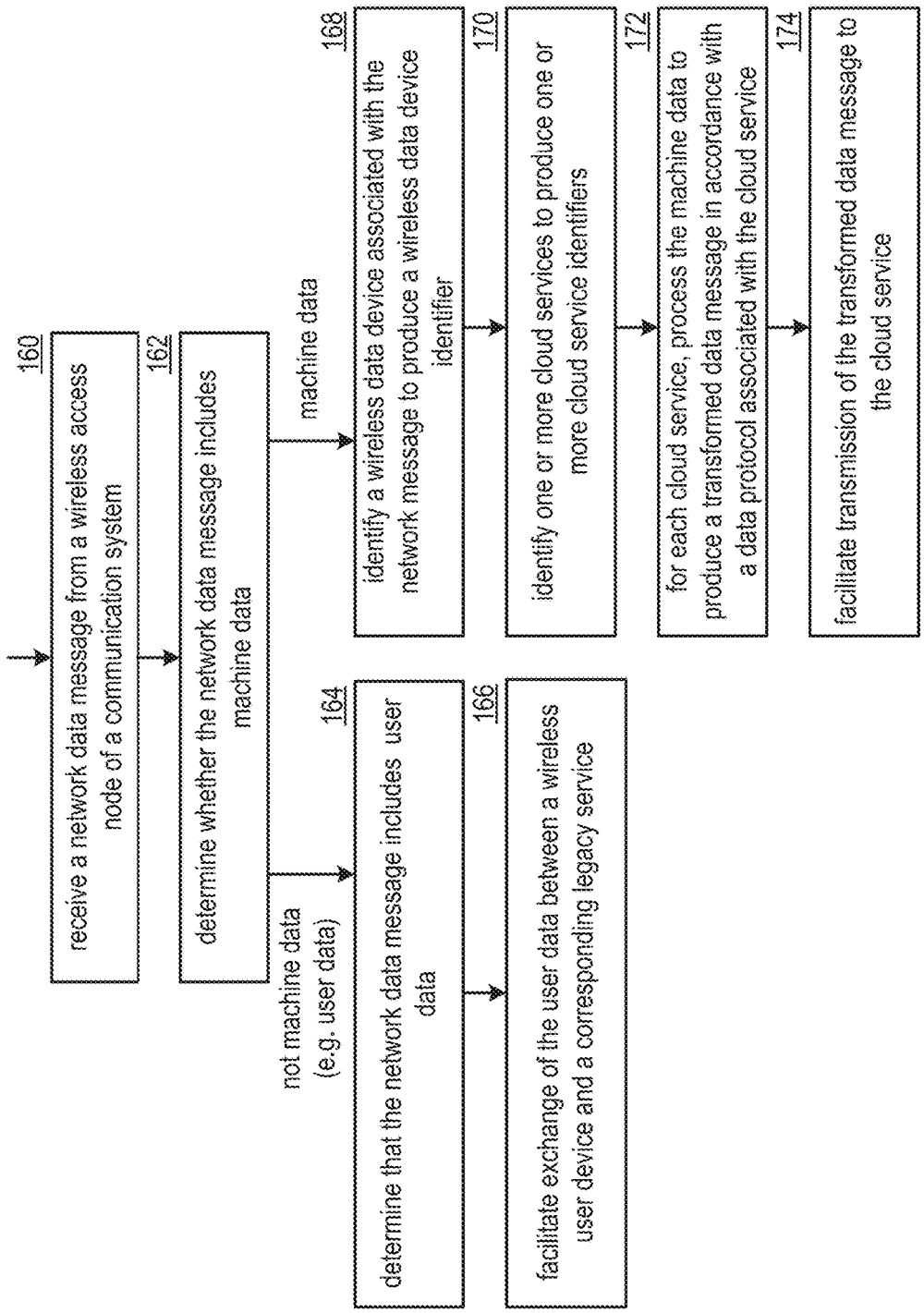

FIGS. 6A, 6B, 6C, 6D, 6E, and 6F are schematic block diagrams of another embodiment of a communication system in accordance with the present invention; and FIG. 6G is a logic diagram of an embodiment of a method for communicating data in accordance with the present invention

DETAILED DESCRIPTION OF THE INVENTION

Figure 1:
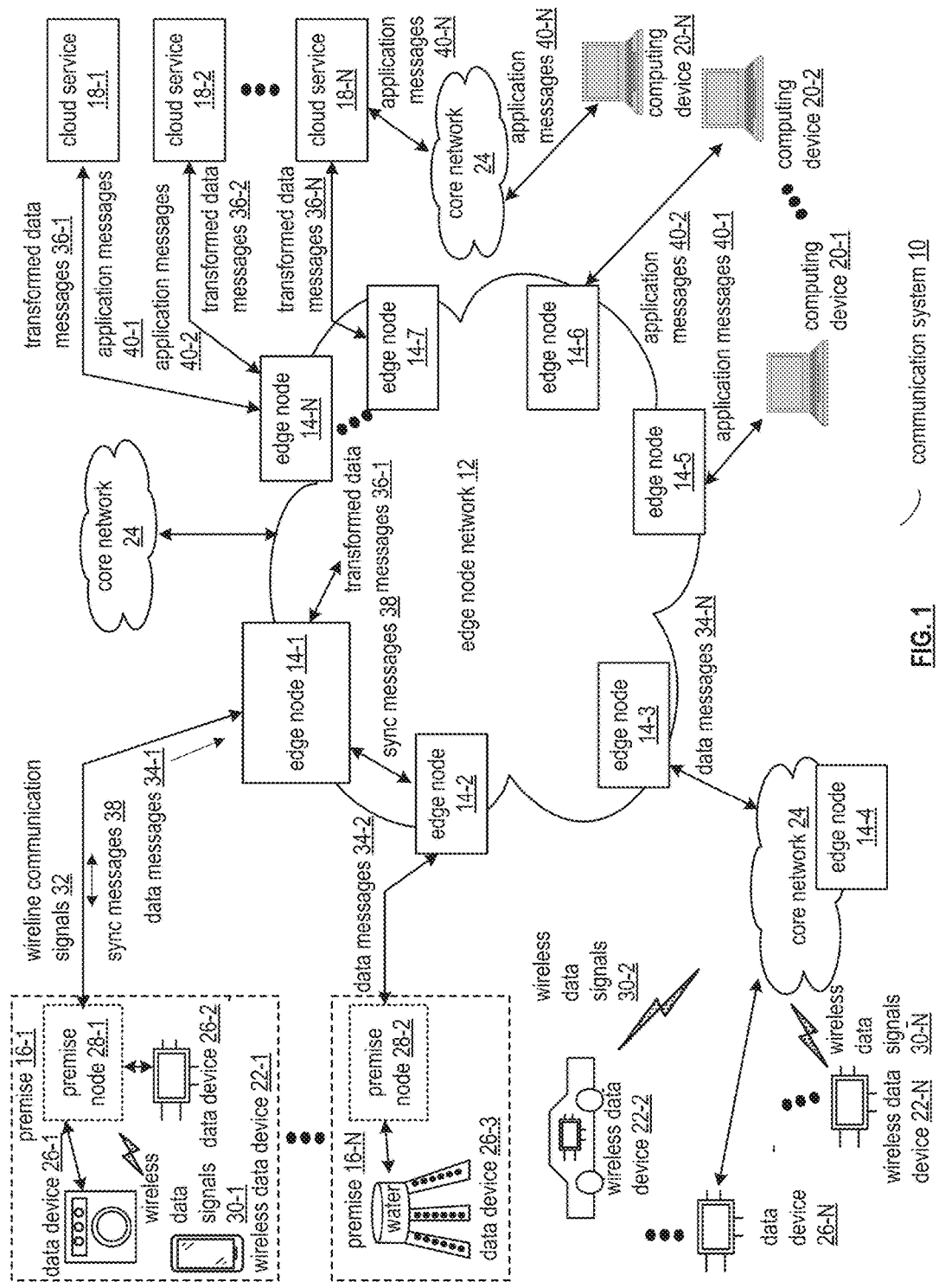
FIG. 1 is a schematic block diagram of an embodiment of a communication system in accordance with the present invention.

FIG. 1 is a schematic block diagram of an embodiment of a communication system 10 that includes an edge network 12, a plurality of premises 16-1 through 16-N, a plurality of cloud services 18-1 through 18-N, a plurality of computing devices 20-1 through 20-N, a plurality of wireless data devices 22-1 through 22-N, at least one core network 24, and a plurality of data devices 26-1 through 26-N. The core network includes at least one of the Internet, a public radio access network (RAN), and any private network. The cloud services 18-1 through 18-N includes a plurality of computing units, application software, storage facilities, and operational control systems to provide as a service one or more of a computing capability, an application hosting function, and a data storage function. Each cloud service may be implemented as a private enterprise system and/or as a publicly available system. Hereafter, the communication system 10 may be interchangeably referred to as a data network, a data communication network, a system, and a data communication system.

The edge network 12 includes a plurality of edge nodes 14-1 through 14-N. Any of the edge nodes may be implemented within the core network 24 and/or may be operably coupled to the core network 24. Alternatively, each edge node may be coupled directly to one or more other edge nodes utilizing various access technologies including one or more of T-carrier/E-carrier (T1/E1), asynchronous transfer mode (ATM), and frame relay, where a transport protocol such as multiprotocol label switching (MPLS) provides communications between distant edge nodes over the excess technology. Any of the premise nodes may be implemented as part of the edge node network 12. Each premise includes at least one premise node of a plurality of premise nodes 28-1 through 28-N, one or more data devices, and one or more wireless data devices. Each premise may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.).

Each data device, wireless data device, edge node, premise node, and computing device includes a computing unit that includes a computing core. In general, a computing unit is any electronic device that can communicate data, process data, and/or store data. A further generality of a computing unit is that it includes a central processing unit (CPU), a memory system, a sensor (e.g., internal or external), user input/output interfaces, peripheral device interfaces, and an interconnecting bus structure.

As further specific examples, each of the data device, wireless data device, edge node, and computing device may be a portable computing device and/or a fixed computing device. A portable computing device may be an embedded controller, a smart sensor, a smart pill, a social networking device, a gaming device, a cell phone, a smart phone, a personal digital assistant, a digital music player, a digital video player, a laptop computer, a handheld computer, a tablet, a video game controller, an engine controller, a vehicular controller, an aircraft controller, a maritime vessel controller, a spacecraft controller, and/or any other portable device that includes a computing core. A fixed computing device may be a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the premise node and edge node is discussed in greater detail with reference to FIG. 2. An embodiment of the data device is discussed in greater detail with reference to FIG. 3 and an embodiment of the wireless data device is discussed in greater detail with reference to FIG. 4.

Generally, the communication system 10 functions to support the processing of data, where aspects of the communication system 10 promote desirable attributes of the processing of the data including a desirable level of security of the data, a desirable level of efficiency of transporting the data, a desirable level of processing performance of the data to produce results, and a desirable level of performance of communicating the results. The processing of the data by the communication system 10 includes obtaining the data (e.g., data messages 34-1 through 34-N) from the data devices 26-1 through 26-N and wireless data devices 22-1 through 22-N, processing the data to produce transformed data messages 36-1 through 36-N, and providing the transformed data messages to corresponding cloud services 18-1 through 18-N for processing and/or storage, where the results (e.g., application messages 40-1 through 40-N) of the processing and/or storage are further accessed by the computing devices 20-1 through 20-N.

Each of the data devices and wireless data devices provides data messages of data messages 34-1 through 34-N, where the data includes one or more of sensor data from a local environment (e.g., a premise) associated with the data device and/or wireless data device, use data (e.g., statistical usage data, user identifiers, error messages, alerts, warnings, level information, etc.) associated with a mechanism (e.g., a machine, a local computer, etc.) affiliated with the data device and/or wireless data device, an interpretation of data collected from sensor data, data input by a local user of the local environment associated with the data device and/or wireless data device, data retrieved from a memory device associated with the data device and/or wireless data device, and any other data produced by the CPU of the data device and/or wireless data device.

In an example of operation of the obtaining of the data, the premise node 28-1 receives sensor data and use data from the data device 26-1 (e.g., via a wireline connection such as optical or electrical), where the data device 26-1 is associated with a washing machine in a home, and where the sensor data and use data is associated with the washing machine. Alternatively, the premise node may receive data from a wireless data device via wireless data signals. For instance, the premise node 28-1 receives wireless data signals 30-1 from the wireless data device 22-1, where the wireless data device 22-1 encodes data associated with a wireless data device 22-1 to produce the wireless data signals 30-1 for transmission to the premise node 28-1 (e.g., direct to the premise node 28-1 when the premise node 28-1 includes a wireless data signal capability, or indirect, via the core network 24, to the premise node 28-1 when utilizing a wireless data signal capability of the core network 24). The wireless data device 22-1 encodes the data in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.).

The receiving of the data may further include execution of one or more security procedures to establish a satisfactory level of trust between the data device and the premise node. The one or more security parameters includes identifying computing devices, challenging identity, exchanging encryption key information, producing encryption keys, encrypting computing unit identifiers, and encrypting data exchanges. For instance, the data device 26-1 and the premise node 28-1 exchange encryption key information (e.g., values required to generate but not expose encryption keys), co-generate a common shared encryption key based on the exchanged encryption key information, save the common shared encryption key, and utilize the common shared encryption key to encrypt content of exchanges between the data device 26-1 and the premise node 28-1, where the encrypting of the content includes direct utilization of the encryption key with an encryption algorithm and utilizing the encryption key to generate a second encryption key for use with the encryption algorithm.

Having received the data and the use data from the data device 26-1, the premise node 28-1 processes the received sensor data and use data to produce the data messages 34-1 in accordance with synchronization (sync) messages 38 received from the edge node network 12. Each edge node and premise node of the edge node network 12 communicates synchronization messages 38 from time to time between nodes, where the synchronization messages 38 includes one or more synchronization parameters.

The synchronization parameters include one or more of control information (e.g., how a node is to operate, i.e. as a premise node and/or as an edge node; which functions are to be included), configuration information (e.g., logical connection paths between nodes, data devices associated with a particular edge node or premise node, data devices associated with particular cloud services, data devices associated with particular applications and/or storage facilities of a particular cloud service, etc.), updated software (e.g., for premise nodes and edge nodes), security information (e.g., public keys, key generation values, key seeds, key identifiers, encryption algorithm identifiers, updated encryption algorithms, secret keys, etc.), routing information (e.g., status of routes between edge nodes, physical links between edge nodes, etc.), addressing information (e.g., identifiers of data devices and wireless data devices, identifiers of premise nodes and edge nodes, identifiers of premises, etc.), presence information (e.g., real-time status of computing units of the computing system 10, historical status information of the computing units, etc.), analytics information (e.g., data types of the data being communicated on the communication system 10, portions of data content of the data, historical patterns of the data type communication, historical usage patterns of the communication system 10 to communicate data on behalf of each data device and wireless data device, etc.), and protocol information (e.g., desired protocol(s) for an application of the plurality of applications supported by the cloud services 18-1 through 18-N, data protocol identifiers associated with the data messages 34-1 through 34-N, data protocols supported by the data devices and wireless data devices, etc.). Alternatively, at least one of the cloud services provides one or more of the synchronization parameters to the edge node network 12.

In the continuation of the example illustrating the obtaining of the data, having produced the data messages 34-1, the premise node 28-1 encodes the data messages 34-1 to produce wireline communication signals 32 in accordance with one or more wireline standards (e.g., optical, electrical) and transmits the wireline communication signals 32 to the edge node 14-1. Alternatively, a data device and/or wireless data device may transmit one or more of the data and the data messages directly to the edge node and/or indirectly via the core network 24 to the edge node. For instance, the wireless data device 22-2 encodes data to produce wireless data signals 30-2 for transmission via the core network 24 to the edge node 14-3. As another instance, the data device 26-N sends, via the network 24, the data and/or data messages 34-N (e.g., produced by the data device 26-N based on the data) to the edge node 14-3. As yet another instance, the wireless data device 22-N transmits wireless data signals 30-N, via the network 24 to the edge node 14-4, where the edge node 14-4 is embedded within a portion of the core network 24 (e.g., when the portion is associated with a radio access network), and where the data device 22-N encodes data associated with the data device 22-N to produce the wireless data signals 30-N, and the edge node 14-4 processes the received data to produce data messages 34-N for transmission to the edge node 14-3.

In an example of operation of the processing of the data, one or more nodes (e.g., premise node, edge node) of the edge node network 12 processes the received data messages 34-1 through 34-N in accordance with the synchronization messages 38 to produce transformed data messages of transformed data messages 36-1 through 36-N to satisfy requirements of one or more of the cloud services 18-1 through 18-N. The processing of the data messages includes one or more of formatting for a particular protocol, performing an interpretation, producing a summary of the data, compacting the data, correlating the data with historical data, correlating the data with real-time data from another data device, extrapolating the data to produce an extrapolation, manipulating the data in accordance with manipulation rules, filtering the data to provide a selected sub-portion, performing a timed transmission of a portion of the data, encrypting the data in accordance with security information to produce encrypted data, producing redundant data, and detecting a threshold level of at least one aspect of the data. For instance, the edge node 14-1 processes the received data messages 34-1 from the data device 26-1 in accordance with protocol information of the synchronization messages 38 to produce transformed data messages 36-1 and transformed data messages 36-2, where the transformed data messages 36-1 are in accordance with a first data application protocol and the transformed data messages 36-2 are in accordance with a second data application protocol, and where the first and second date application protocols are utilized by first and second data applications of the cloud services 18-1 and 18-2 respectively.

In an example of operation of the providing of the transformed data messages to the corresponding cloud services, having produced the transformed data messages, the corresponding edge node identifies one or more of the cloud services to receive the transformed data messages, where the identifying is based on the synchronization messages 38. For example, the edge node 14-1 identifies the cloud service 18-1 to receive the transformed data messages 36-1 when the configuration information of the synchronization messages 38 identifies that the first data application protocol is associated with a corresponding application of the cloud service 18-1 and that the data device 26-1 is affiliated with the corresponding application of the cloud service 18-1. Similarly, the edge node 14-1 identifies the cloud service 18-2 to receive the transformed data messages 36-2 when the configuration information identifies that the second data application protocol is associated with another corresponding application of the cloud service 18-2 and that the data device 26-1 is further affiliated with the other corresponding application of the cloud service 18-2.

Having identified or cloud services to receive the transformed data messages, the edge node facilitates transmission of the transformed data messages to the identified cloud services. The facilitation includes one or more of sending the transformed data messages via a plurality of the edge nodes based on the presence information and/or routing information of the synchronization messages 38 to the identified cloud services.

The facilitation may further include sending the transformed data via the core network 24 to the identified cloud services. In an example of sending the transformed data messages via the plurality of edge nodes, the edge node 14-1 associates the transformed data messages 36-1 with a communications path to include edge node 14-5 and edge node 14-N to communicate to the cloud service 18-1 when the presence information associated with the edge nodes 14-5 and 14-N is favorable (e.g., available with sufficient capacity for favorable performance levels) and when the routing information identifies required physical and logical paths to establish the communication path. In an example of sending the transformed data messages via the core network 24, the edge node 14-1 associates the transformed data messages 36-2 with another communications path to include the core network 24 and the edge node 14-N to communicate to the cloud service 18-2 when the presence information associated with the edge node 14-N is favorable and when the routing information identifies required physical and logical paths to establish the other communication path.

Figure 2:
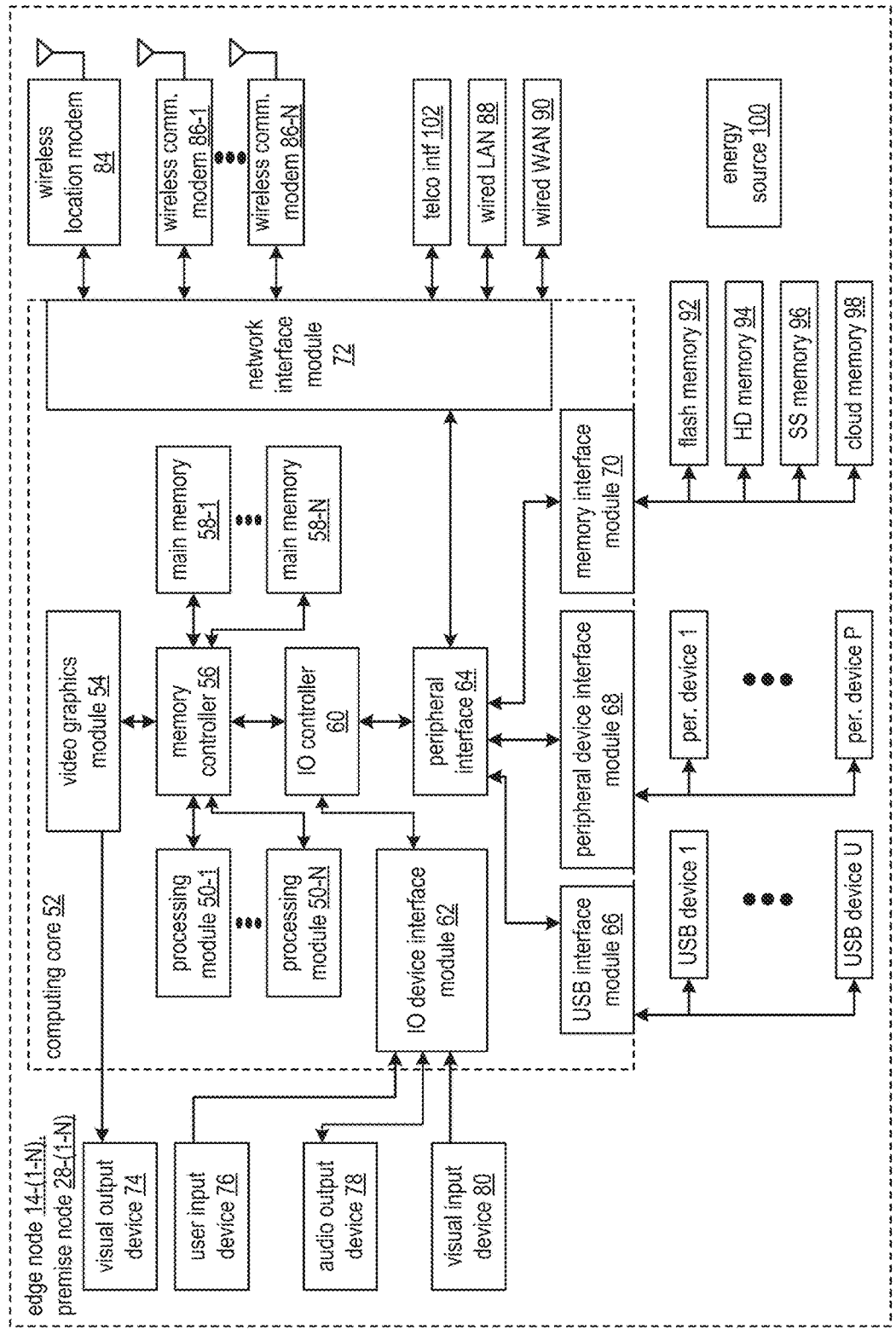
FIG. 2 is a schematic block diagram of an embodiment of an edge node of a communication system in accordance with the present invention.

FIG. 2 is a schematic block diagram of an embodiment of the edge nodes 14-1 through 14-N and the premise nodes 28-1 through 28-N of the communication system 10 of FIG. 1. The edge nodes and premise nodes include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), one or more visual input devices 80 (e.g., camera, photocell, etc.), one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, one or more solid state (SS) memory devices 96, and/or cloud memory 98), one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), a wired local area network (LAN) 88 (e.g., optical, electrical), a wired wide area network (WAN) 90 (e.g., optical, electrical), and an energy source 100 (e.g., a battery, a solar power source, a fuel cell, a capacitor, a generator, mains power, backup power, etc.).

The computing core 52 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the edge nodes and premise nodes. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system). In other embodiments, the premise node and/or edge node may include more or less devices and modules than shown in this example embodiment of the premise node and edge node.

Figure 3:
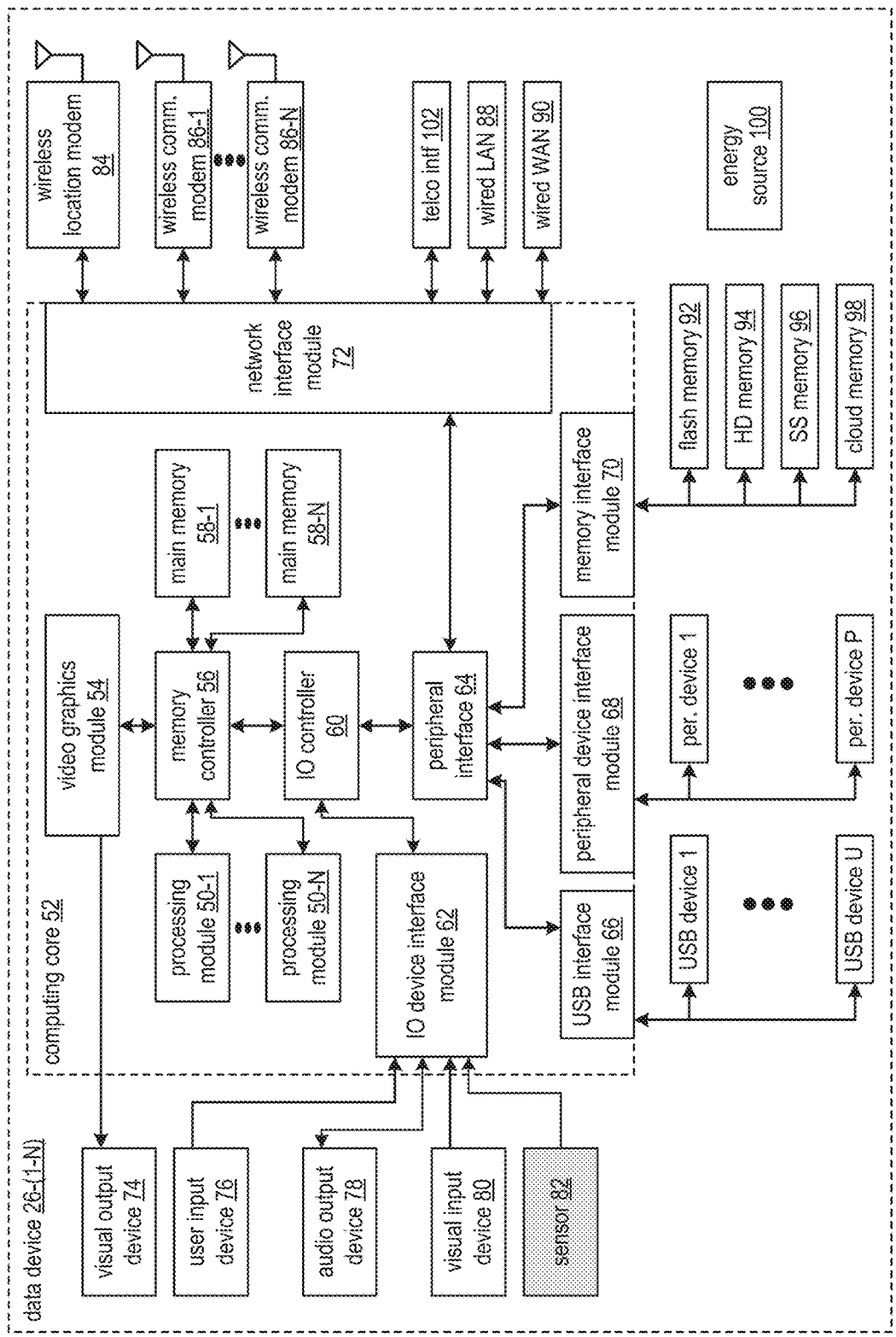
FIG. 3 is a schematic block diagram of an embodiment of a data device of a communication system in accordance with the present invention.

FIG. 3 is a schematic block diagram of an embodiment of the data devices 26-1 through 26-N of the communication system 10 of FIG. 1. The data devices include the visual output device 74 of FIG. 2, the user input device 76 of FIG. 2, the audio output device 78 of FIG. 2, the visual input device 80 of FIG. 2, and one or more sensors 82 implemented internally and/or externally to the data device (e.g., accelerometer, velocity, compass, motion, gyro, temperature, pressure, altitude, humidity, moisture, imaging, biometric, infrared, audio, ultrasonic, proximity, magnetic field, biomaterial, radiation, weight, density, chemical, fluid flow volume, DNA, wind speed, wind direction, object detection, object identifier, motion recognition, battery level, a room temperature sensor, a sound detector, a smoke detector, an intrusion detector, a motion detector, a door position sensor, a window position sensor, a sunlight detector, medical categories: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.).

The data devices further include the computing core 52 of FIG. 2, the one or more universal serial bus (USB) devices (USB devices 1-U) of FIG. 2, the one or more peripheral devices (e.g., peripheral devices 1-P) of FIG. 2, the one or more memories of FIG. 2 (e.g., flash memories 92, HD memories 94, SS memories 96, and/or cloud memories 98), the one or more wireless location modems 84 of FIG. 2, the one or more wireless communication modems 86-1 through 86-N of FIG. 2, the telco interface 102 of FIG. 2, the wired local area network (LAN) 88 of FIG. 2, the wired wide area network (WAN) 90 of FIG. 2, and the energy source 100 of FIG. 2. In other embodiments, the data device may include more or less devices and modules than shown in this example embodiment of the data device.

Figure 4:
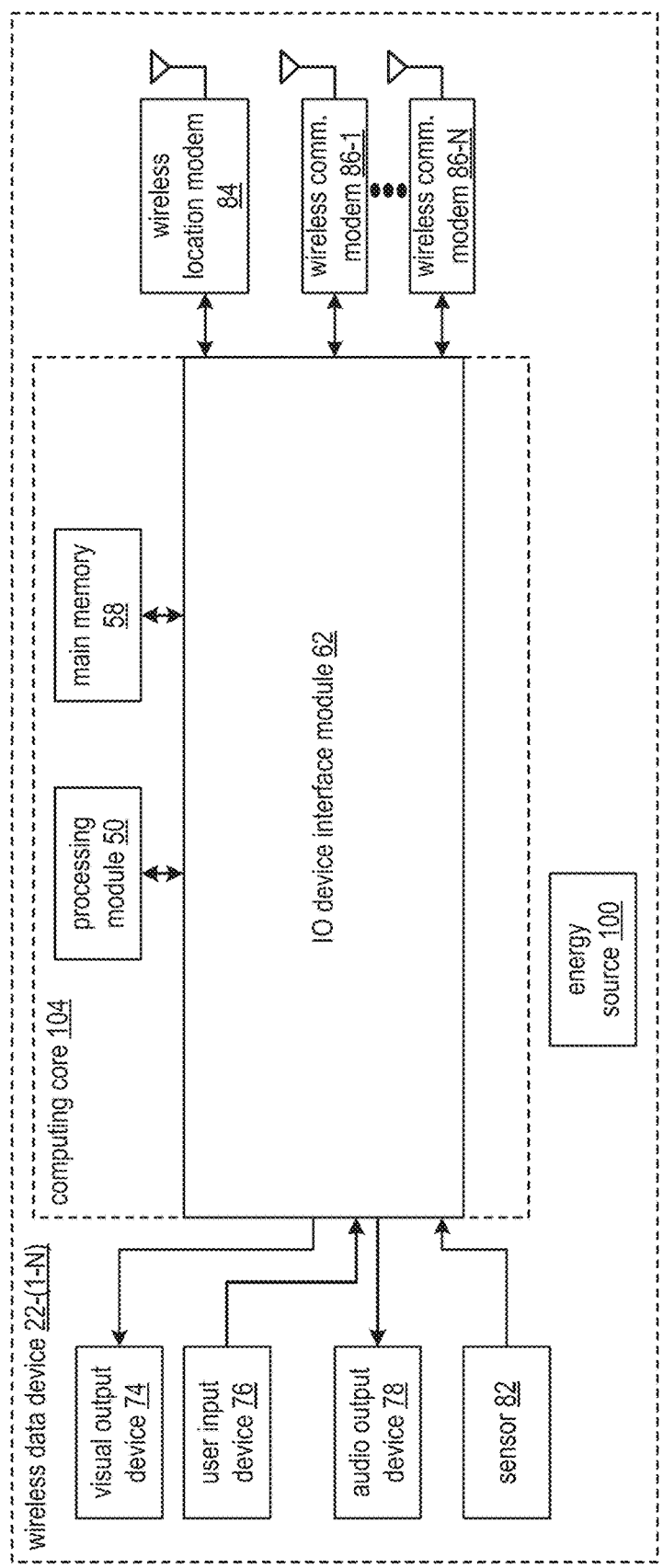
FIG. 4 is a schematic block diagram of an embodiment of a wireless data device of a communication system in accordance with the present invention.

FIG. 4 is a schematic block diagram of an embodiment of the wireless data devices 22-1 through 22-N of the communication system 10 of FIG. 1. The wireless data devices include the one or more visual output devices 74 of FIG. 2, the one or more user input devices 76 of Figure two, the one or more audio output devices 78 of FIG. 2, the one or more sensors 82 of FIG. 3, a computing core 104, the one or more wireless location modems 84 of FIG. 2, the one or more wireless communication modems 86-1 through 86-N of FIG. 2, and the energy source 100 of FIG. 2. The computing core 104 includes at least one processing module 50 of the processing modules 50-1 through 50-N of FIG. 2, at least one main memory 58 of the main memories 58-1 through 58-N of FIG. 2, and the I/O device interface module 62 of FIG. 2. In other embodiments, the wireless data device may include more or less devices and modules than shown in this example embodiment of the wireless data device.

Figure 5:
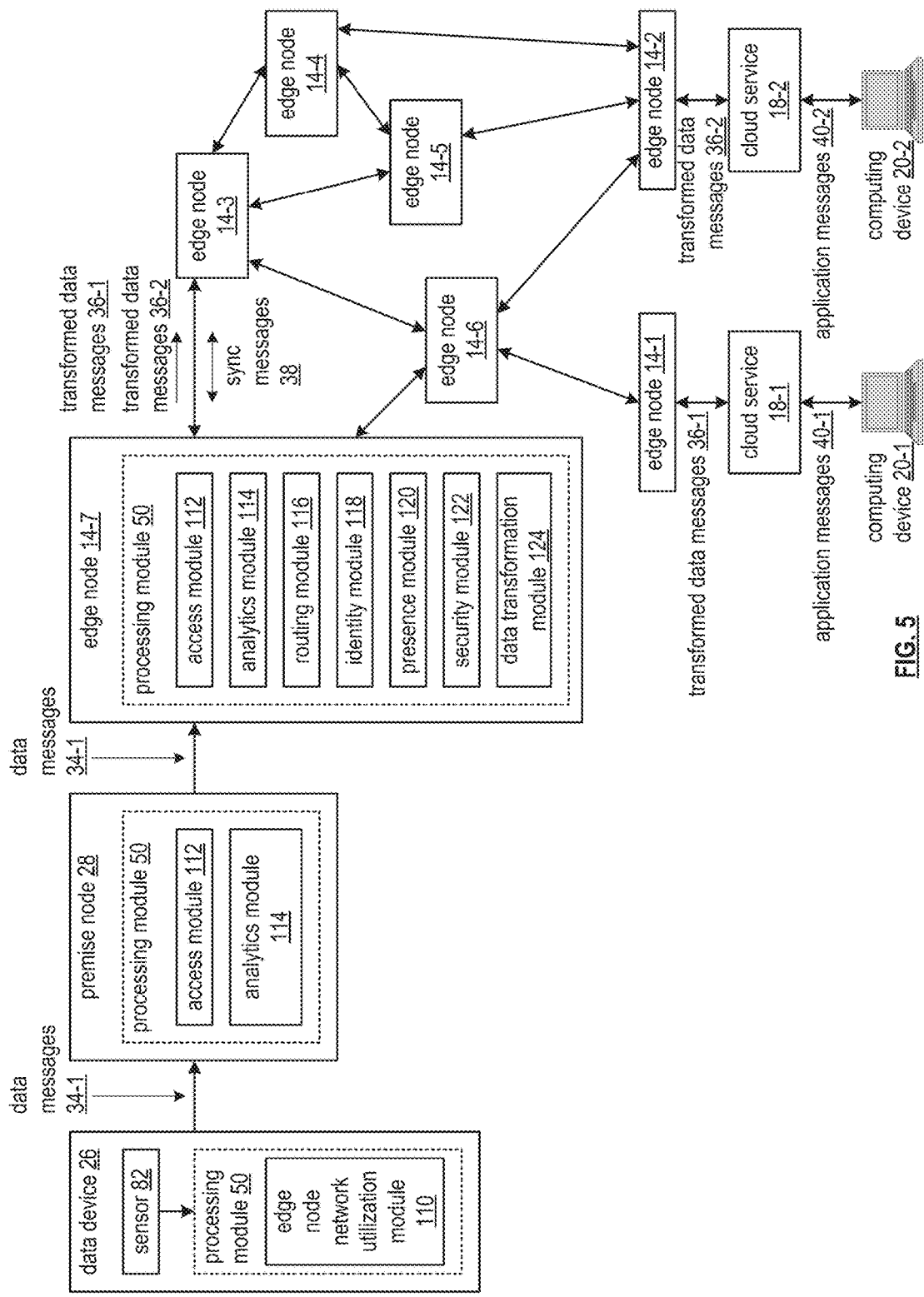
FIG. 5 is a schematic block diagram of another embodiment of a communication system in accordance with the present invention.

FIG. 5 is a schematic block diagram of another embodiment of a communication system that includes a data device 26, a premise node 28, a plurality of edge nodes 14-1 through 14-7, at least two cloud services 18-1 and 18-2, and at least two computing devices 20-1 and 20-2. The data device 26 may include one or more of the devices and the modules of the data devices 26-1 through 26-N of FIG. 3.

For example, the data device 26 includes the sensor 82 of FIG. 3 and the processing module 50 of FIG. 3, where the processing module 50 of the data device 26 includes an edge node network utilization module 110. The premise node 28 may include one or more of the devices and the modules of the premise nodes 28-1 through 28-N of FIG. 2. For example, the premise node 28 includes the processing module 50 of FIG. 2, where the processing module 50 of the premise node 28 includes an access module 112 and an analytics module 114.

Each edge node of the plurality of edge nodes 14-1 through 14-7 may include one or more of the devices and the modules of the edge nodes 14-1 through 14-N of FIG. 2. For example, each edge node 14-1 through 14-7 includes the processing module 50 of FIG. 2, where the processing module 50 of the edge nodes 14-1 through 14-7 includes the access module 112, the analytics module 114, a routing module 116, an identity module 118, a presence module 120, a security module 122, and a data transformation module 124. The edge node network utilization module 110 may include one or more of the functions associated with the edge nodes 14-1 through 14-7. For instance, the edge node network utilization module 110 includes the access module 112, the identity module 118, and the security module 122.

Generally, the modules 112-124 within the processing modules 50 of the data device 26, the premise node 28, and the edge nodes 14-1 through 14-7 process (e.g., generate, store, utilize for decision-making, transfer) the synchronization parameters previously discussed. For example, functionality of the access module 112 includes causing the processing module 50 to utilize one or more of the protocol information and the configuration information to provide physical access to other nodes and/or devices. Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge nodes.

Further examples of the processing include functionality of the identity module 118, which includes causing the processing module 50 to utilize the addressing information to identify which sensors are associated with which data devices and which data devices are to access which cloud services. Functionality of the presence module 120 includes causing the processing module 50 to utilize the presence information to optimize utilization of various edge nodes to optimize data traffic routes between the data device and a corresponding cloud service. Functionality of the security module 122 includes causing the processing module 50 to utilize the security information to authenticate a desirable and valid connection between nodes and devices and to protect confidential information exchange between the nodes and devices. Functionality of the data transformation module 124 includes causing the processing module 50 to utilize the protocol information to convert portions of the data messages into the transformed data messages to support multiple desirable attributes of the communication system including a favorable security level, a favorable efficiency level, a favorable data latency level, and a favorable compatibility level with numerous data protocols associated with data applications of the cloud services.

In an example of operation of the communication system, the edge nodes 14-1 through 14-7, the premise node 28, and the data device 26 exchange synchronization messages 38 from time to time to develop and convey the synchronization parameters. For example, at least some the edge nodes 14-1 through 14-7 convey, by exchanging with each other, at least some of the synchronization parameters to include one or more of the configuration information, the analytics information, the protocol information, the addressing information, the security information, the routing information, and the presence information. For instance, edge node 14-1 receives one or more of the synchronization patterns from the cloud service 18-1 for local storage within a memory of the edge node 14-1, where a trusted edge node control application of the cloud service 18-1 is affiliated with the plurality of edge nodes 14-1 through 14-7. In another instance, edge node 14-1 generates a synchronization message 38 to include substantially all of the synchronization parameters and transmits the synchronization message 38 to the edge node 14-6 to update the synchronization parameters stored locally within a memory of the edge node 14-6.

As another example of the developing and conveying of the synchronization parameters, at least some the edge nodes 14-1 through 14-7, the premise node 28, and the data device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the premise node 28 exchanges limited security information (e.g., to lead to generation of a common secret encryption key) with the data device 26 to further develop trusted security between the premise node 28 and the data device 26. In another instance, the premise node 28 receives configuration information from the data device 26, where the configuration information includes addressing information associated with the sensor 82, and receives companion configuration information from a data application associated with the cloud service 18-1 to match the sensor with the data application to generate further updated configuration information. In yet another instance, the edge node 14-7 monitors data messages received from the premise node 28 to generate updated analytics information based on data attributes of data within the data messages (e.g., data types, data sizes, etc.).

Having developed and conveyed a sufficient number and sufficient level of the synchronization parameters to support ongoing operations, the communication system facilitates communication of data from the sensor 82 to one or more corresponding data applications of the cloud services 18-1 and 18-2. In an example of operation of the communication of the data, having established trust and security information between the data device 26 and the premise node 28, the premise node 28 receives data messages 34-1 from the data device 26, where the edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQTT), constrained application protocol (CoAP), and data distribution service (DDS).

Having received the data messages 34-1, the premise node 28 identifies active data applications associated with the cloud services 18-1 and 18-2 that are affiliated with the data device 26 and/or the sensor 82 based on one or more of the addressing information and the configuration information. Having identified the active data applications, the premise node 28 determines at least a portion of a route for transferring data associated with the data messages 34-1 to the cloud services 18-1 and 18-2 based on one or more of the routing information and the presence information. Having determined the routing information, the premise node 28 sends the data messages 34-1 to the edge node 14-7 in accordance with the routing information.

Having received the data messages 34-1, the edge node 14-7 determines whether to convert the data messages into transformed data messages based on one or more of the configuration information, the analytics information, the addressing information, and the protocol information. For instance, the edge node 14-7 determines to convert the data messages 34-1 from the sensor data protocol into first and second data message protocols when the protocol information indicates that the first and second data protocol messages are associated with the affiliated data applications of the cloud services 18-1 and 18-2. In another instance, the edge node 14-7 determines to convert the data messages 34-1 from the sensor data protocol into a third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that cloud services 18-1 and 18-2 are compatible with the third data message protocol.

Having determined to convert the data messages 34-1, the edge node 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information. For instance, the edge node 14-7 determines an updated route to include sending the transformed data messages to the edge node 14-3 when the updated presence information and updated routing information are favorable with regards to utilizing the edge node 14-3 and sending the transformed data messages 36-1 and 36-2 to the edge node 14-3. Alternatively, the edge node 14-7 transmits the transformed data messages 36-1 and 36-2 directly to the cloud services 18-1 and 18-2 via the core network 24 of FIG. 1 when attributes of the routing information are favorable for such a route.

Having received the transformed data messages 36-1, the edge node 14-1 facilitates forwarding of the transformed data messages 36-1 to the cloud service 18-1 for utilization by the corresponding data application affiliated with the data device 26 and/or the sensor 82. Having received the transformed data messages 36-2, the edge node 14-2 facilitates forwarding of the transformed data messages 36-2 to the cloud service 18-2 for utilization by the corresponding data application affiliated with the data device 26 and/or the sensor 82. Having processed the transformed data messages 36-1, the cloud service 18-1 exchanges corresponding application messages 40-1 with the computing device 20-1. Having processed the transformed data messages 36-2, the cloud service 18-2 exchanges corresponding application messages 40-2 with the computing device 20-2.

FIGS. 6A, 6B, 6C, 6D, 6E, and 6F are schematic block diagrams of another embodiment of a communication system that includes a wireless data device 22, the core network 24 of FIG. 1, the edge node network 12 of FIG. 1, at least two cloud services 18-1 and 18-2 of FIG. 1, a wireless user device 128, and a legacy services 130 (e.g., one or more legacy servers supporting one or more legacy data applications). The wireless data device 22 may include one or more of the devices and the modules of the data devices 22-1 through 22-N of FIG. 4. For example, the wireless data device 22 includes sensors 82-1 through 82-3 implemented utilizing the sensors 82 of FIG. 3, the processing module 50 of FIG. 4, and a wireless communication modem 86 implemented utilizing at least one of the wireless communication modems 86-1 through 86-N of FIG. 4, where the processing module 50 of the wireless data device 22 includes the edge node network utilization module 110 of FIG. 5.

The core network 24 includes a wireless access node 132 and an edge node 14, where the edge node 14 may include one or more of the devices and the modules of the edge nodes 14-1 through 14-N of FIG. 2. For example, the edge node 14 includes the processing module 50 of FIG. 2, where the processing module 50 of the edge nodes 14 includes the access module 112 of FIG. 5, the analytics module 114 of FIG. 5, the routing module 116 of FIG. 5, the identity module 118 of FIG. 5, the presence module 120 of FIG. 5, the security module 122 of FIG. 5, and the data transformation module 124 of FIG. 5.

The wireless access node 132 of the core network 24 may include one or more wireless access facilities (e.g., a base station transceiver in a GSM network, an evolved node B in a long term evolution (LTE) network, etc.) such as in a public wireless network (e.g., a cellular radio access network (RAN)) and the wireless user device 128 may be implemented utilizing a wireless device associated with the public wireless network (e.g., a smart phone operated by a consumer subscribing to the cellular radio access network). The wireless user device 128 and the wireless access node 132 exchange wireless data signals 30-1 in accordance with one or more public wireless network industry standards (e.g., global system for mobile communications (GSM), long term evolution (LTE, etc.), where the core network 24 supports voice and data services for the legacy wireless device 128.

When supporting a data service associated with the public wireless network industry standard, data may be exchanged between the wireless user device 128 and the one or more legacy data applications executing on one or more servers of the legacy services 130, where the wireless access node 132 outputs network data messages 134 in accordance with the public wireless network industry standard (e.g., a bearer channel typically utilized to interface to a packet data network gateway supporting the S1-U interface between the evolved node B and a serving gateway) and where the legacy services 130 communicates legacy data type messages 136 in accordance with the public wireless network industry standard (e.g., supporting the Gi or SGi interface).

The communication system generally functions to optimize communication of data between a wireless device and at least one or another wireless data and a server hosted application. The data may be encoded into wireless data signals for transmission between the wireless device and another wireless data and/or the server hosted application via a radio access network (RAN). The data may include user data (e.g., generally large data files and/or streams) and/or machine data (e.g., small clusters of data bytes associated with the sensors 82-1 through 82-3).

FIG. 6A illustrates an example of operation of the optimizing communications of data, where the data includes the user data. When communicating the user data, the wireless user device 128 exchanges wireless data signals 30-1 with the wireless access node 132, where the user data is encoded into the wireless data signals 30-1. The wireless access node 132 converts between the wireless data signals 30-1 and the network data messages 134.

The edge node 14 receives the network data messages 134 from the wireless access node 132 of the communication system. The receiving generally includes at least one of interpreting one or more data packets from the wireless access node 132 utilizing a radio access network protocol to produce the network data messages 134 (e.g. in accordance with the S1-U protocol), obtaining authentication information when the network data messages 134 includes the user data, and obtaining local authentication information when the network data message includes machine data. An example of receiving the machine data is discussed in greater detail with reference to FIGS. 6B-F.

The obtaining of the authentication information may include one or more of receiving from a radio access network (RAN) and/or associated mobility management entity (MME) or similar entity of the RAN, performing a lookup, issuing a request, interpreting a response, and extracting the authentication information from the network data messages 134. For instance, the access module 112 interprets the network data messages 134 to produce the user data. As another instance, the access module 112 accesses a memory of the core network 24 to retrieve the authentication information.

Having received the network data messages 134, the edge node 14 determines whether the network data messages 134 includes the machine data (e.g., or the user data, or something else). The determining whether the network data messages 134 includes the machine data includes at least one of detecting that the wireless data device 22 caused the receiving of the network data messages 134 to produce a favorable machine data indicator (e.g., indicating that the network data messages 134 includes the machine data), interpreting local authentication information associated with the wireless data device 22 to produce the favorable machine data indicator (e.g., the wireless data device 22 has previously registered with the edge node 14 to produce a local authentication information and perhaps has not registered with other elements of the RAN; or one of the cloud services 18-1 or 18-2 instructs the edge node 14 that the wireless data device 22 is a machine data source), detecting a machine datatype of the network data message to produce the favorable machine data indicator, (e.g., comparing the received data to a list of known datatypes, i.e., indicate machine data when small groups of data such as sensor data), and detecting a machine data pattern of the network data message to produce the favorable machine data indicator (e.g., identifying a current data pattern, comparing the current data pattern to a list of known data patterns, i.e., indicate machine data when a series of sensor data upload bursts).

When the network data messages 134 does not include the machine data, the edge node 14 determines that the network data messages 134 includes the user data. The determining that the network data messages 134 includes the user data includes at least one of identifying the wireless user device identifier of the wireless user device to produce a favorable user data indicator (e.g., extracting an identifier from the network data messages 134, receiving an indication from another module, i.e., the MME, setting the user data indicator to indicate that the network data messages 134 includes the user data based on the wireless user device identifier), interpreting authentication information associated with the wireless user device 128 to produce a favorable user data indicator (e.g., accessing a cache of MME authentication information to find the wireless user device inferring that wireless user device is not a machine), detecting a user datatype of the network data message to produce the favorable user data indicator (e.g., comparing data of the network data messages 134 to a list of known datatypes, i.e., indicating user data when detecting a large file), and detecting a user data pattern of the network data message to produce the favorable user data indicator (e.g., identifying the current data pattern, comparing the current data pattern to the list of known data patterns, i.e., indicating user data when a series of web requests and web downloads). For instance, the access module 112 determines that the network data messages 134 includes the user data when detecting the user datatype.

When the edge node 14 determines that the network data messages 134 includes the user data, the edge node 14 facilitates exchange of the user data between the wireless user device 128 associated with the network data messages 134 and the corresponding legacy services 130. For instance, the routing module 116 transforms the user data between the network data messages 134 and the legacy datatype messages 136 and exchanges the legacy datatype messages 136 with the legacy services 130 and exchanges the network data messages 134 with the wireless access node 132.

FIG. 6B further illustrates the example of operation of the optimizing communications of data, where the data includes the machine data. When communicating the machine data, the wireless data device 22 exchanges wireless data signals 30-2 with the wireless access node 132, where the machine data is encoded into the wireless data signals 30-2. The wireless access node 132 converts between the wireless data signals 30-2 and the network data messages 134.

The edge node 14 receives the network data messages 134 from the wireless access node 132 of the communication system. The receiving includes at least one of interpreting one or more data packets from the wireless access node 132 utilizing a radio access network protocol to produce the network data messages 134 (e.g. in accordance with the S1-U protocol), obtaining authentication information when the network data messages 134 includes the user data, and obtaining local authentication information when the network data messages 134 includes the machine data.

The obtaining of the local authentication information includes at least one of interpreting the network data messages 134 to include at least a portion of the local authentication information, where the edge node network utilization module 110 exchanges, via the wireless data signals 30-2, the portion of the local authentication information with the wireless access node 132, retrieving the local authentication information from a memory of the edge node 14, and receiving the local authentication information from at least one of the cloud services 18-1 and 18-2. For instance, the access module 112 receives the portion of the local authentication information, where the security module 122 verifies (e.g., confirms using a security mechanism that the processing module 50 the wireless data device 22 is to serve as a proxy for the sending of machine data from the sensors 82-1 through 82-3) the portion of the local authentication information generated by the edge node network utilization module 110.

Having received the network data messages 134, the edge node 14 determines whether the network data messages 134 includes the machine data. For instance, the identity module 118 determines that the wireless data device 22 caused the receiving of the network data messages 134 to produce a favorable machine data indicator (e.g., indicating that the network data messages 134 includes the machine data). In another instance, the security module 122 interprets the local authentication information associated with the wireless data device 22 to produce the favorable machine data indicator when the local authentication information indicates that the wireless data device 22 is associated with machine data. In yet another instance, the analytics module 114 detects the machine datatype of the network data messages 134 to produce the favorable machine data indicator. In a still further instance, the analytics module 114 detects a machine data pattern of the network data messages 134 to produce the favorable machine data indicator.

When the network data messages 134 includes the machine data, the edge node 14 identifies the wireless data device 22 associated with the network data messages 134 to produce a wireless data device identifier. The identifying of the wireless data device 22 associated with the network data messages 134 to produce the wireless data device identifier includes at least one of interpreting the local authentication information associated with the wireless data device 22 to produce the wireless data device identifier (e.g., accessing the local authentication information for machine devices associated with the edge node 14, issuing a request, interpreting a response), extracting the wireless data device identifier from the network data messages 134, and extracting the wireless data device identifier from another network data message associated with a registration procedure (e.g., accessing the analytics information to find the other data message that includes one or more attach requests, where at least one of the requests includes the wireless data device identifier). For instance, the identity module 118 accesses a memory of the edge node 14 to retrieve the local authentication information and locates an authentication record associated with the wireless data device 22 to produce the wireless data device identifier.

FIG. 6C further illustrates the example of operation of the optimizing communications of data, where the data includes the machine data. Having identified the wireless data device 22 associated with the network data messages 134, the edge node identifies the one or more cloud services to produce one or more cloud service identifiers.

The identifying the one or more cloud services to produce the one or more cloud service identifiers includes at least one of interpreting configuration information associated with the wireless data device 22 to produce the one or more cloud service identifiers (e.g., retrieving configuration information and identifying associated cloud services), selecting the one or more cloud service identifiers based on a machine datatype of the machine data (e.g., identifying the machine datatype of the data message, performing a lookup based on the machine datatype to produce the one or more cloud service identifiers), identifying the one or more cloud service identifiers based on an association between the network data messages 134 and one or more data applications (e.g., selecting a data application, performing a lookup for the data application to identify the one or more cloud service identifiers), selecting the one or more cloud service identifiers based on a subscription request from the wireless data device 22 (e.g., receiving an application of the request, identifying an application of the request, choosing a cloud service associated with the application, i.e., capability and availability are favorable), and analyzing analytics information associated with the machine data pattern to produce the one or more cloud service identifiers, where the machine data pattern includes the machine data (e.g., accessing historical data messages of the analytics information and comparing the network data messages 134 to identify a particular machine data pattern, identifying the one or more cloud services based on the identified particular machine data pattern).

As a specific example of the identifying the one or more cloud services to produce the one or more cloud service identifiers, the identity module 118 interprets the configuration information associated with the wireless data device 22 to produce the one or more cloud service identifiers, where an established association between the wireless data device 22 and the one or more cloud service identifiers has been established. As another specific example of the identifying the one or more cloud services, the data transformation module 124 detects the machine datatype of the machine data, performs a lookup based on the machine datatype to produce the one or more cloud service identifiers, where an established association between the machine datatype in the one or more cloud service identifiers has been established. As yet another specific example of the identifying the one or more cloud services, the data transformation module 124 and/or the identity module 118 performs a configuration information lookup to identify the one or more data applications and retrieve the one or more cloud service identifiers based on the association between the network data messages 134 and the one or more data applications.

As a still further specific example of the identifying the one or more cloud services, the access module 112 interprets the subscription request from the wireless data device 22, where the subscription request identifies one or more of the sensor 82-1, data messages 34-1 including machine data from the sensor 82-1, and the application of the request, where the sensor 82-1 and the application of the request are associated with the cloud service identifier. As a yet still further specific example of the identifying the one or more cloud services, the analytics module 114 analyzes analytics information associated with the machine data pattern, compares the machine data pattern to a plurality of known machine data patterns, identifies a particular listed machine data pattern that compares favorably to the machine data pattern, and identifies the one or more cloud service identifiers based on the particular listed machine data pattern.

Having identified the one or more cloud services, for each cloud service, the edge node 14 processes the machine data to produce a transformed data message, where the transformed data message is in accordance with a data protocol associated with the cloud service. The processing the machine data to produce the transformed data message may include at least one of selecting the data protocol based on the cloud service identifier associated with the cloud service (e.g., performing a lookup within the configuration information utilizing the cloud service identifier), and selecting the data protocol based on a data application to be supported by the cloud service (e.g., identify the data application based on one or more of a request, a lookup, and an interpretation of a sequence of data exchanges; perform a lookup of the data application with the corresponding cloud service that is available; choose a data protocol based on a protocol of the data messages, i.e., 34-1).

The processing the machine data to produce the transformed data message may further include at least one of analyzing analytics information associated with the machine data pattern to select the data protocol, where the machine data pattern includes the machine data (e.g., access historical data messages of the analytics information and compare the data message to identify a particular machine data pattern, identify one or more data protocols based on the identified particular machine data pattern), selecting another data protocol for another cloud service based the data protocol of the cloud service, where the other data protocol and data protocol are the same, selecting the other data protocol for the other cloud service based the data protocol of the cloud service, where the other data protocol and data protocol are different, and selecting a common data protocol for at least two other cloud services based on the data protocol of the cloud service, where the common data protocol and data protocol are the same.

As a specific example of selecting the data protocol, the data transformation module 124 performs a configuration information lookup utilizing the cloud service identifier of the cloud service 18-1 to produce a data protocol A identifier of the data protocol. As another specific example of selecting the data protocol, the analytics module 114 identifies the data application to be supported by the cloud service based on the interpretation of the analytics information that includes the sequence of data exchanges and performs a configuration information lookup based on the identified data application to produce the data protocol A identifier of the data protocol. As yet another specific example of selecting the data protocol, the data transformation module 124 performs a configuration information lookup utilizing the machine data pattern produced by the analytics module 114 to produce the data protocol A identifier of the data protocol.

Having selected the data protocol, the edge node 14 processes the machine data (e.g., represented by data messages 34-1) to produce the transformed data message in accordance with the selected data protocol. For example, the data transformation module 124 processes the machine data of the network data messages 134 in accordance with the data protocol A to produce protocol A transformed data messages 140-1.

Having produced the transformed data message, the edge node 14 facilitates transmission of the transformed data message to the cloud service. The facilitating transmission of the transformed data message to the cloud service includes at least one of obtaining presence information for nodes of a network capable of transferring the transformed data message to the cloud service (e.g., accessing locally stored presence information, generate updated presence information, i.e., pinging nodes, determining availability of the nodes, where these nodes may be part of the edge node network 12 and/or part of the core network 24), obtaining routing information for the nodes of the network capable of transferring the transformed data message to the cloud service (e.g., accessing locally stored routing information, generating updated routing information, i.e., pinging nodes, determining node capabilities and selecting nodes capable of forwarding the transformed data messages), selecting at least a portion of a route to the cloud service based on one or more of the presence information and the routing information (e.g., interpreting the presence information, interpreting the routing information, selecting based on the presence information, the routing information, security information, bandwidth performance requirements, latency performance requirements and other performance requirements to select the at least a portion of the route), and analyzing the analytics information associated with the machine data pattern to select the at least a portion of the route to the cloud service, where the machine data pattern includes the machine data.

As a specific example of selecting the at least the portion of the route to the cloud service by analyzing the analytics information, the data transformation module 124 receives the analytics information from the analytics module 114, where the analytics information includes the machine data pattern (e.g., a historical record of previous routes between nodes of the edge node network 12, a correlation of performance of the previous routes to the types of machine data, a correlation of performance of the previous routes to the machine data pattern). Having received the analytics information, the data transformation module 124 selects a favorable route that includes nodes associated with favorable performance based on the correlations of previous routes to the type of machine data and the machine data pattern.

The facilitating transmission of the transformed data to the cloud service further includes initiating transmission of the transformed data message to the cloud service. For example, the routing module 116 transmits the protocol A transformed data message 140-1 to the cloud service 18-1 via the edge node network 12, where the edge node network 12 may relay the protocol A transformed data message 140-1 between a plurality of other edge nodes 14 within the edge node network 12 and/or between a plurality of nodes of the core network 24 in accordance with one or more of the presence information, the routing information, and the portion of the route to the cloud service (e.g., a first receiving edge node 14 of the edge node network 12).

FIG. 6D further illustrates the example of operation of the optimizing communications of data, where the data includes the machine data. In particular, subsequent to the edge node network utilization module 110 receiving the machine data from the sensor 82-2, transmitting the machine data as data messages 34-2, via the wireless data signals 30-2, to the wireless access node 132, the wireless access node 132 sending the network data messages 134 to the edge node 14, and the edge node 14 receiving the data network messages 134, determining that the network data messages 134 includes the machine data, identifying the wireless data device 22, the edge node 14 further identifies the one or more cloud services to be associated with the sensor 82-2 to produce one or more cloud service identifiers. For instance, the routing module 116 selects the cloud service 18-2 based on the identity of the wireless data device 22 and the sensor 82-2.

Having selected the one or more cloud services, the edge node 14 processes the machine data to produce a transformed data message, where the processing includes selecting a data protocol and processing the machine data to produce the transformed data message in accordance with the selected data protocol. The selecting of the data protocol includes selecting another data protocol for another cloud service based on the data protocol (e.g., that was previously selected) for the cloud service (e.g., that was previously selected with the previously selected data protocol), where the other data protocol and data protocol are different. For example, the data transformation module 124 selects data protocol B as the other data protocol, where data protocol B and data protocol A are different. For instance, the data transformation module 124 selects the data protocol B based on a data application affiliation with the sensor 82-2. Having selected the data protocol, the edge node 14 processes the machine data utilizing the selected data protocol to produce the transformed data message. For example, the data transformation module 124 processes the machine data from the sensor 82-2 utilizing the data protocol B to produce protocol B transformed data messages 140-2.

Having produced the transformed data message, the edge node 14 facilitates transmission of the transformed data message to the cloud service. For example, the routing module 116 determines a route based on routing information and transmits the protocol B transformed data messages 140-2 to the cloud service 18-2 in accordance with the route.

FIG. 6E further illustrates the example of operation of the optimizing communications of data, where the data includes the machine data. In particular, subsequent to the edge node network utilization module 110 receiving the machine data from the sensor 82-3, transmitting the machine data as data messages 34-3, via the wireless data signals 30-2, to the wireless access node 132, the wireless access node 132 sending the network data messages 134 to the edge node 14, and the edge node 14 receiving the data network messages 134, determining that the network data messages 134 includes the machine data, identifying the wireless data device 22, the edge node 14 further identifies the one or more cloud services to be associated with the sensor 82-3 to produce one or more cloud service identifiers. For instance, the routing module 116 selects the cloud services 18-1 and 18-2 based on the identity of the wireless data device 22 and the sensor 82-3.

Having selected the one or more cloud services, the edge node 14 processes the machine data to produce a transformed data message, where the processing includes selecting a data protocol and processing the machine data to produce the transformed data message in accordance with the selected data protocol. The selecting of the data protocol includes selecting a common data protocol for two or more cloud services when at least two cloud services have been selected and each of the at least two cloud services supports the common data protocol. For example, the data transformation module 124 selects data protocol C as the common data protocol when the cloud service 18-1 and the cloud service 18-2 support the data protocol C. Having selected the data protocol, the edge node 14 processes the machine data utilizing the selected data protocol to produce the transformed data message. For example, the data transformation module 124 processes the machine data from the sensor 82-3 utilizing the data protocol C to produce protocol C transformed data messages 140-3. Alternatively, the routing module 116 sends the data messages 34-3 that includes the machine data to another edge node of the edge node network 12, where the other edge node processes the machine data utilizing the data protocol C to produce the protocol C transformed data messages 140-3.

Having produced the transformed data messages, at least one of the edge node 14 and the other edge node facilitates transmission of the transformed data messages to the cloud services. For example, the routing module 116 determines routes based on routing information and transmits the protocol C transformed data messages 140-3 to the cloud services 18-1 and 18-2 in accordance with the routes.

FIG. 6F further illustrates the example of operation of the optimizing communications of data, where the data includes the machine data. In particular, subsequent to the edge node network utilization module 110 receiving the machine data from the sensor 82-3, transmitting the machine data as data messages 34-3, via the wireless data signals 30-2, to the wireless access node 132, the wireless access node 132 sending the network data messages 134 to the edge node 14, and the edge node 14 receiving the data network messages 134, determining that the network data messages 134 includes the machine data, identifying the wireless data device 22, the edge node 14 further identifies the one or more cloud services to be associated with the sensor 82-3 to produce one or more cloud service identifiers. For instance, the routing module 116 selects the cloud services 18-1 and 18-2 based on the identity of the wireless data device 22 and the sensor 82-3.

Having selected the one or more cloud services, the edge node 14 and/or another edge node of the edge node network 12 processes the machine data to produce a transformed data message, where the processing includes selecting a data protocol for each cloud service and processing the machine data to produce the transformed data message in accordance with the selected data protocol. The selecting of the data protocol includes selecting at least two data protocols for a corresponding at least two cloud services when the at least two cloud services do not support a common data protocol or when different data protocols supports favorable performance. For example, the data transformation module 124 selects the data protocol A for the cloud service 18-1 when the cloud service 18-1 supports the data protocol A but not the data protocol B, and selects the data protocol B for the cloud service 18-2 when the cloud service 18-2 supports the data protocol B but not the data protocol A.

Having selected the data protocols, at least one of the edge node 14 and the other edge node of the edge node network 12 processes the machine data utilizing the selected data protocols to produce the transformed data messages. For example, the data transformation module 124 processes the machine data from the sensor 82-3 utilizing the data protocol A to produce protocol A transformed data messages 140-4 and processes the machine data utilizing the data protocol B to produce protocol B transformed data messages 140-5. Alternatively, the routing module 116 sends the data messages 34-3, that includes the machine data, to the other edge node of the edge node network 12, where the other edge node processes the machine data utilizing the data protocol A and B to produce the protocol A transformed data messages 140-4 and the protocol B transformed data messages 140-5.

Having produced the transformed data messages, at least one of the edge node 14 and the other edge node facilitates transmission of the transformed data messages to the cloud services. As a specific example, the routing module 116 determines routes based on routing information and transmits the protocol A transformed data messages 140-4 to the cloud service 18-1 and transmits the protocol B transformed data messages 140-5 to the cloud service 18-2 in accordance with the routes. As another specific example, the routing module 116 sends the data messages 34-3 to the other edge node of the edge node network 12, the other edge node determines the routes based on the routing information and transmits the protocol A transformed data messages 140-4 to the cloud service 18-1 and transmits the protocol B transformed data messages 140-5 to the cloud service 18-2 in accordance with the routes.

FIG. 6G is a logic diagram of an embodiment of a method for communicating data within a communication system. In particular, a method is presented for use in conjunction with one or more functions and features described in conjunction with FIGS. 1-5, 6A-6F, and also FIG. 6G. The method includes step 160 where a processing module of a computing device (e.g., of an edge node) receives a network data message from a wireless access node of the communication system. The receiving of the network data message includes interpreting one or more data packets from the wireless access node that may be utilizing a radio access network (RAN) protocol (e.g. the S1-U protocol). The receiving of the network data message may further include one of obtaining authentication information when the network data message includes user data and obtaining local authentication information when the network data message includes machine data. As a specific example of the obtaining, the processing module extracts the authentication information from authenticated International Mobile Subscriber Identity (IMSI) information received from an MME session request over a S11 interface that is associated with the network data message. As another specific example, the processing module retrieves the local authentication information from a memory associated with the computing unit.

The method continues at step 162 where the processing module determines whether the network data message includes the machine data. The determining whether the network data message includes the machine data may be accomplished by a variety of approaches. A first approaches includes detecting that a wireless data device caused the receiving of the network data message to produce a favorable machine data indicator (e.g., favorable indicating machine data). A second approach includes interpreting the local authentication information associated with the wireless data device to produce the favorable machine data indicator. A first instance of the second approach includes interpreting local authentication information associated with devices that have registered and authenticated as wireless data devices with the computing unit (e.g. edge node). A second instance of the second approach includes the edge node receiving an instruction from the cloud service that the network data message is associated with the wireless data device to produce the favorable machine data indicator.

A third approach of determining whether the network data message includes the machine data includes detecting a machine datatype of the network data message to produce the favorable machine data indicator. An instance of the third approach includes comparing the received datatype to a list of known datatypes associated with machine data and producing the favorable machine data indicator when the comparison is favorable. A fourth approach includes detecting a machine data pattern of the network data message to produce the favorable machine data indicator. An instance of the fourth approach includes identifying a current data pattern, comparing the current data pattern to a list of known machine data patterns gained via analytics, and producing the favorable machine data indicator when the comparison is favorable.

The method branches to step 168 when the processing module determines that the network data message includes the machine data. The method continues to step 164 when the processing module determines that the network data message does not include the machine data (e.g., includes the user data).

When the network data message does not include the machine data, the method continues at step 164 where the processing module determines that the network data message includes the user data. The determining that the network data message includes the user data can be accomplished by several approaches. A first approach includes identifying a wireless user device identifier of the wireless user device to produce a favorable user data indicator (e.g., favorable when the network data message includes the user data). An instance includes the processing module identifying a user data indicator field within the network data message and producing the favorable user data indicator. A second approach includes interpreting authentication information associated with the wireless user device to produce the favorable user data indicator. An instance includes accessing a cache of MME authentication information (e.g., stored within the edge node) to locate a record associated with a source of the network data message, verifying that the record is associated with a wireless user device, and producing the favorable user data indicator.

A third approach to determine that the network data message includes the user data includes detecting a user datatype of the network data message to produce the favorable user data indicator. An instance includes comparing the detected datatype to a list of known datatypes, and producing the favorable user data indicator when the comparison is favorable of the detected datatype to a listed user datatype. A fourth approach includes detecting a user data pattern of the network data message to produce the favorable user data indicator. An instance of the fourth approach includes identifying a current data pattern, comparing the current data pattern to a list of known user data patterns gained via analytics (e.g., a series of web server requests followed by large web server responses or downloads), and using the favorable user data indicator when the current data pattern compares favorably to at least one of the known user data patterns. The method continues at step 166 where the processing module facilitates the exchange of the user data between the wireless user device associated with the network data message and a corresponding legacy service using appropriate legacy protocols (e.g. SGi). For instance, the processing module translates messages between the wireless node and the legacy service in accordance with one or more industry standards.

When the network data message includes the machine data, the method continues at step 168 where the processing module identifies the wireless data device associated with the network data message to produce a wireless data device identifier. The producing the wireless data device identifier may be accomplished by several approaches. A first approach includes interpreting the local authentication information associated with the wireless data device to produce the wireless data device identifier. An instance includes issuing a request to a local registration database of wireless data devices maintained by the computing unit (e.g. the edge node) and interpreting a response to the request, where the response includes the wireless data device identifier. A second approach includes extracting the wireless data device identifier from the network data message. A third approach includes extracting the wireless data device identifier from another network data message associated with a registration procedure. An instance includes accessing analytics information to find the other data message that includes one or more attach requests, where at least one of the requests includes the wireless data device identifier.

The method continues at step 170 where the processing module identifies the one or more cloud services to produce one or more cloud service identifiers. The producing of the one or more cloud service identifiers may be accomplished by several approaches. A first approach includes interpreting configuration information associated with the wireless data device to produce the one or more cloud identifiers. A second approach includes selecting the one or more cloud service identifiers based on a machine datatype of the machine data. An instance includes identifying the machine datatype of the data message and performing a lookup based on the machine datatype to produce the one or more cloud service identifiers. A third approach includes identifying the one or more cloud service identifiers based on an association between the network data message and one or more data applications. An instance includes identifying a data application indicated within the network data message, performing a lookup based on the data application to identify the one or more cloud services that support the data application, and identifying the one or more cloud service identifiers based on the one or more cloud services.

A fourth approach of producing the one or more cloud service identifiers includes selecting the one or more cloud service identifiers based on a subscription request from the wireless data device. An instance includes, for each cloud service identifier, receiving the request, identifying an application of the request, identifying a cloud service associated with the identified application, and producing the cloud service identifier associated with the identified cloud service. A fifth approach includes analyzing analytics information associated with the machine data pattern to produce the one or more cloud service identifiers, where the machine data pattern includes the machine data. An instance includes accessing analytics information collected from historical data messages, comparing the network data messages to the analytics information to identify a particular machine data pattern, identifying one or more cloud services based on the identified machine data pattern, and producing the cloud service identifiers based on the identified one or more cloud services.

For each cloud service, the method continues at step 172 where the processing module processes the machine data to produce a transformed data message, where the transformed data message is in accordance with a data protocol associated with the cloud service. The producing of the transformed data message may be accomplished by several approaches. A first approach includes selecting the data protocol based on the cloud service identifier associated with the cloud service. An instance includes performing a lookup in the configuration information associated with the cloud service identifier to select the data protocol. A second approach includes selecting the data protocol based on a data application to be supported by the cloud service. An instance includes identifying the data application (e.g., based on one or more of a request, a lookup, and an interpretation of sequence of data exchanges) and performing a lookup to select the data protocol based on the identified data application. A third approach includes analyzing analytics information associated with the machine data pattern to select the data protocol, where the machine data pattern includes the machine data. An instance includes obtaining the machine data pattern (e.g., based on analytics) accessing analytics information collected from historical data messages revealing previous machine data patterns, comparing the machine data pattern to the previous machine data patterns to identify a particular machine data pattern, and identifying one or more data protocols based on the comparison.

A fourth approach of processing the machine data in accordance with the data protocol includes selecting another data protocol for another cloud service based on the data protocol of the cloud service, where the other data protocol and data protocol are the same (e.g., when the data is to be transmitted to two cloud services utilizing the same data protocol). A fifth approach includes selecting the other data protocol for the other cloud service based on the data protocol of the cloud service, where the other data protocol and data protocol are different (e.g., when the data is to be transmitted to the two cloud services utilizing different data protocols). A fifth approach includes selecting a common data protocol for at least two other cloud services based on the data protocol of the cloud service, where the common data protocol and data protocol are the same (e.g., when the data is to be transmitted to three or more cloud services utilizing a common data protocol).

The method continues at step 174 where the processing module facilitates transmission of the transformed data message to the cloud service. The facilitating of the transmission of the transformed data message to the cloud service may be accomplished by several approaches. A first approach includes obtaining presence information for nodes of a network capable of transferring the transformed data message to the cloud service Specific examples includes accessing locally stored presence information, generating updated presence information, (i.e., pinging nodes), and determining availability of the nodes. A second approach includes obtaining routing information for the nodes of the network capable of transferring the transformed data message to the cloud service. Specific examples include accessing locally stored routing information, generating updated routing information (i.e., pinging nodes), and determining node capabilities. A third approach includes selecting at least a portion of a route to the cloud service based on one or more of the presence information and the routing information. Specific examples include interpreting the presence information, interpreting the routing information, and including other considerations such as security requirements, bandwidth requirements, latency requirements and other performance requirements to select the at least a portion of the route. A fourth approach includes analyzing analytics information associated with a machine data pattern to select the at least a portion of the route to the cloud service, where the machine data pattern includes the machine data. An instance includes accessing analytics information collected from historical data messages, comparing the data messages to identify a particular machine data pattern, and performing a lookup based on the identified particular data pattern to select the at least a portion of the route to the cloud service. A fifth approach includes transmitting the transformed data message to the cloud service in accordance with at least a portion of the route.

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for processing machine data within a communication system, wherein the method is executed by a plurality of processing modules of a plurality of computing units of the communication system, wherein the method comprises:
   receiving a network data message from a wireless access node of the communication system;
   determining whether the network data message includes machine data;
   when the network data message includes the machine data:
      identifying a wireless data device associated with the network data message to produce a wireless data device identifier;
      identifying one or more cloud services to produce one or more cloud service identifiers; and
      for each cloud service:
         processing the machine data to produce a transformed data message, wherein the transformed data message is in accordance with a data protocol associated with the cloud service; and
         facilitating transmission of the transformed data message to the cloud service; and
   when the network data message does not include the machine data:
      determining that the network data message includes user data; and
      facilitating exchange of the user data between a wireless user device associated with the network data message and a corresponding legacy service.

2. The method of claim 1, wherein the determining that the network data message includes the user data comprises at least one of:
   identifying a wireless user device identifier of the wireless user device to produce a favorable user data indicator;
   interpreting authentication information associated with the wireless user device to produce the favorable user data indicator;
   detecting a user datatype of the network data message to produce the favorable user data indicator; and
   detecting a user data pattern of the network data message to produce the favorable user data indicator.

3. The method of claim 1, wherein the receiving the network data message from the wireless access node of the communication system comprises at least one of:
   interpreting one or more data packets from the wireless access node utilizing a radio access network protocol to produce the network data message;
   obtaining authentication information when the network data message includes the user data; and
   obtaining local authentication information when the network data message includes the machine data.

4. The method of claim 1, wherein the determining whether the network data message includes the machine data comprises at least one of:
   detecting that the wireless data device caused the receiving of the network data message to produce a favorable machine data indicator;
   interpreting local authentication information associated with the wireless data device to produce the favorable machine data indicator;
   detecting a machine datatype of the network data message to produce the favorable machine data indicator; and
   detecting a machine data pattern of the network data message to produce the favorable machine data indicator.

5. The method of claim 1, wherein the identifying the wireless data device associated with the network data message to produce the wireless data device identifier comprises at least one of:
   interpreting local authentication information associated with the wireless data device to produce the wireless data device identifier;
   extracting the wireless data device identifier from the network data message; and
   extracting the wireless data device identifier from another network data message associated with a registration procedure.

6. The method of claim 1, wherein the identifying the one or more cloud services to produce the one or more cloud service identifiers comprises at least one of:
   interpreting configuration information associated with the wireless data device to produce the one or more cloud service identifiers;
   selecting the one or more cloud service identifiers based on a machine datatype of the machine data;
   identifying the one or more cloud service identifiers based on an association between the network data message and one or more data applications;
   selecting the one or more cloud service identifiers based on a subscription request from the wireless data device; and
   analyzing analytics information associated with a machine data pattern to produce the one or more cloud service identifiers, wherein the machine data pattern includes the machine data.

7. The method of claim 1, wherein the processing the machine data to produce the transformed data message comprises at least one of:
   selecting the data protocol based on the cloud service identifier associated with the cloud service;
   selecting the data protocol based on a data application to be supported by the cloud service;
   analyzing analytics information associated with a machine data pattern to select the data protocol, wherein the machine data pattern includes the machine data;
   selecting another data protocol for another cloud service based the data protocol of the cloud service, wherein the other data protocol and data protocol are the same;
   selecting the other data protocol for the other cloud service based the data protocol of the cloud service, wherein the other data protocol and data protocol are different; and selecting a common data protocol for at least two other cloud services based on the data protocol of the cloud service, wherein the common data protocol and data protocol are the same.

8. The method of claim 1, wherein the facilitating transmission of the transformed data message to the cloud service comprises at least one of:
   obtaining presence information for nodes of a network capable of transferring the transformed data message to the cloud service;
   obtaining routing information for the nodes of the network capable of transferring the transformed data message to the cloud service;
   selecting at least a portion of a route to the cloud service based on one or more of the presence information and the routing information; and
   analyzing analytics information associated with a machine data pattern to select the at least a portion of the route to the cloud service, wherein the machine data pattern includes the machine data.

9. A non-transitory computer readable memory comprises:
   a first memory element that stores operational instructions that, when executed by a processing module of a computing unit of a communication system, causes the computing unit to:
      receive a network data message from a wireless access node of the communication system;
   a second memory element that stores operational instructions that, when executed by the processing module of the computing unit, causes the computing unit to:
      determine whether the network data message includes machine data;
   a third memory element that stores operational instructions that, when executed by the processing module of the computing unit, causes the computing unit to:
      when the network data message includes the machine data:
         identify a wireless data device associated with the network data message to produce a wireless data device identifier;
         identify one or more cloud services to produce one or more cloud service identifiers; and
         for each cloud service:
            process the machine data to produce a transformed data message, wherein the transformed data message is in accordance with a data protocol associated with the cloud service; and
            facilitate transmission of the transformed data message to the cloud service; and
   a fourth memory element that stores operational instructions that, when executed by the processing module of the computing unit, causes the computing unit to:
      when the network data message does not include the machine data:
         determine that the network data message includes user data; and
         facilitate exchange of the user data between a wireless user device associated with the network data message and a corresponding legacy service.

10. The non-transitory computer readable memory of claim 9 further comprises:
    the fourth memory element that further stores operational instructions that, when executed by the processing module of the computing unit, causes the computing unit to determine that the network data message includes the user data by at least one of:
       identifying a wireless user device identifier of the wireless user device to produce a favorable user data indicator;
       interpreting authentication information associated with the wireless user device to produce the favorable user data indicator;
       detecting a user datatype of the network data message to produce the favorable user data indicator; and
       detecting a user data pattern of the network data message to produce the favorable user data indicator.

11. The non-transitory computer readable memory of claim 9 further comprises:
    the first memory element that further stores operational instructions that, when executed by the processing module of the computing unit, causes the computing unit to receive the network data message from the wireless access node of the communication system by at least one of:
       interpreting one or more data packets from the wireless access node utilizing a radio access network protocol to produce the network data message;
       obtaining authentication information when the network data message includes the user data; and
       obtaining local authentication information when the network data message includes the machine data.

12. The non-transitory computer readable memory of claim 9 further comprises:
    the second memory element that further stores operational instructions that, when executed by the processing module of the computing unit, causes the computing unit to determine that the network data message includes the machine data by at least one of:
       detecting that the wireless data device caused the computing unit to receive the network data message to produce a favorable machine data indicator;
       interpreting local authentication information associated with the wireless data device to produce the favorable machine data indicator;
       detecting a machine datatype of the network data message to produce the favorable machine data indicator; and
       detecting a machine data pattern of the network data message to produce the favorable machine data indicator.

13. The non-transitory computer readable memory of claim 9 further comprises:
    the third memory element that further stores operational instructions that, when executed by the processing module of the computing unit, causes the computing unit to identify the wireless data device associated with the network data message by at least one of:
       interpreting local authentication information associated with the wireless data device to produce the wireless data device identifier;
       extracting the wireless data device identifier from the network data message; and
       extracting the wireless data device identifier from another network data message associated with a registration procedure.

14. The non-transitory computer readable memory of claim 9 further comprises:
    the third memory element that further stores operational instructions that, when executed by the processing module of the computing unit, causes the computing unit to identify the one or more cloud services by at least one of:

interpreting configuration information associated with the wireless data device to produce the one or more cloud service identifiers;

selecting the one or more cloud service identifiers based on a machine datatype of the machine data;

identifying the one or more cloud service identifiers based on an association between the network data message and one or more data applications;

selecting the one or more cloud service identifiers based on a subscription request from the wireless data device; and analyzing analytics information associated with a machine data pattern to produce the one or more cloud service identifiers, wherein the machine data pattern includes the machine data.

15. The non-transitory computer readable memory of claim 9 further comprises:

the third memory element that further stores operational instructions that, when executed by the processing module of the computing unit, causes the computing unit to produce the transformed data message by at least one of:

selecting the data protocol based on the cloud service identifier associated with the cloud service;

selecting the data protocol based on a data application to be supported by the cloud service;

analyzing analytics information associated with a machine data pattern to select the data protocol, wherein the machine data pattern includes the machine data;

selecting another data protocol for another cloud service based the data protocol of the cloud service, wherein the other data protocol and data protocol are the same;

selecting the other data protocol for the other cloud service based the data protocol of the cloud service, wherein the other data protocol and data protocol are different; and selecting a common data protocol for at least two other cloud services based on the data protocol of the cloud service, wherein the common data protocol and data protocol are the same.

16. The non-transitory computer readable memory of claim 9 further comprises:

the third memory element that further stores operational instructions that, when executed by the processing module of the computing unit, causes the computing unit to facilitate the transmission of the transformed data message to the cloud service by at least one of:

obtaining presence information for nodes of a network capable of transferring the transformed data message to the cloud service;

obtaining routing information for the nodes of the network capable of transferring the transformed data message to the cloud service;

selecting at least a portion of a route to the cloud service based on one or more of the presence information and the routing information; and analyzing analytics information associated with a machine data pattern to select the at least a portion of the route to the cloud service, wherein the machine data pattern includes the machine data.

* * * * *